United States Patent [19]
Yamaoka et al.

[11] Patent Number: 5,909,720
[45] Date of Patent: Jun. 8, 1999

[54] DRIVING SYSTEM WITH ENGINE STARTING CONTROL

[75] Inventors: Masaaki Yamaoka; Tetsuya Abe, both of Toyota; Hideaki Matsui; Yutaka Taga, both of Aich-ken, all of Japan

[73] Assignee: Toyota Jidosha Kabushiki Kaisha, Toyota, Japan

[21] Appl. No.: 08/845,170

[22] Filed: Apr. 21, 1997

[30] Foreign Application Priority Data

Jul. 18, 1996 [JP] Japan ................................. 8-209231
Mar. 4, 1997 [JP] Japan ................................. 9-067336

[51] Int. Cl.⁶ .......................... F02D 13/02; B60K 6/00; B60L 11/00
[52] U.S. Cl. ............................. 123/179.3; 123/182.1; 180/65.2
[58] Field of Search .................. 123/90.15, 179.3, 123/179.4, 179.16, 179.17, 179.18, 179.28, 182.1; 180/65.2; 290/34

[56] References Cited

U.S. PATENT DOCUMENTS 5,632,238  5/1997  Furukawa et al. ............... 123/182.1 X

FOREIGN PATENT DOCUMENTS

A 59-115412  7/1984  Japan .
A 3-185229   8/1991  Japan .
A 6-144020   5/1994  Japan .

Primary Examiner—Tony M. Argenbright
Attorney, Agent, or Firm—Oliff & Berridge, PLC

[57] ABSTRACT

In the process of starting an engine 150, the structure of the present invention lags an open and close timing of an intake valve 152 of the engine 150, thereby enabling a first motor MG1 mechanically linked with a crankshaft 156 via a damper 157 to motor the engine 150. When the revolving speed of the engine 150 exceeds a specific range that causes a resonance, the open and close timing of the intake valve 152 is returned to an ordinary level, so as to start controls of a fuel supply to the engine 150 and ignition. The lagged open and close timing of the intake valve 152 decreases the effective compression ratio of the engine 150, thus enabling smooth rotations of the engine 150 and reducing the amplitude of the torsional vibrations of the crankshaft 156. This structure enables the revolving speed of the engine 150 to swiftly pass through the specific range that causes a resonance.

18 Claims, 21 Drawing Sheets

DRIVING SYSTEM WITH ENGINE STARTING CONTROL

BACKGROUND OF THE INVENTION

1. Field of the Invention

The present invention relates to a driving system. More specifically the present invention pertains to a driving system, wherein an output shaft of an internal combustion engine and a rotating shaft of a motor are mechanically linked with each other via a damper.

2. Description of the Related Art

Proposed driving systems include an internal combustion engine and two motors mounted on a hybrid vehicle (for example, disclosed in JAPANESE PATENT LAYING-OPEN GAZETTE No. 6-144020). In this proposed system, an output shaft of the internal combustion engine is linked with a rotating shaft of a first motor via a damper and a first clutch. The rotating shaft of the first motor is further linked via a second clutch with a drive shaft that mechanically connects with wheels. The drive shaft is also connected to a second motor. The first motor cranks or motors the internal combustion engine in the state that the first clutch is connected and the second clutch is released, thereby starting the internal combustion engine. After a start of the internal combustion engine, the power output from the internal combustion engine is used to enable the first motor to function as a generator and charge the battery in the above state of the clutches. Alternatively the power from the internal combustion engine is directly output to the drive shaft in the state that the second clutch is also in linkage, thereby driving the vehicle.

The crankshaft, which is the output shaft of the internal combustion engine, is generally a resilient body having a localized mass distribution and hence forms a vibrating system having the infinite degree of freedom. A torque variation due to a gas explosion or reciprocating motions of the piston in the internal combustion engine causes torsional vibrations of the crankshaft. When the natural frequency of the crankshaft coincides with the forcible frequency, a resonance occurs. An increase in amplitude of such torsional vibrations causes a foreign noise or abrasion of gears in the crankshaft system, and even leads to a fatigue destruction of the crankshaft in some cases. In order to avoid these troubles due to the torsional vibrations of the crankshaft, a variety of dampers have been proposed and used for reducing the amplitude of the torsional vibrations. The dampers having a significant effect on reduction of the amplitude of the torsional vibrations, however, require a special damping mechanism. This increases the required number of parts and makes the damper undesirably bulky. The small-sized simple dampers, on the other hand, have little effects.

The resonance occurs in many cases when the revolving speed of the crankshaft is not greater than an idle revolving speed, although it depends upon the type of the internal combustion engine. The conventional driving system, which motors the crankshaft of the internal combustion engine by the motor that is linked with the crankshaft via the damper, causes a resonance in the process of starting the internal combustion engine. A possible technique to solve this problem drives the motor by a specific control (vibration-regulating control). This technique, however, can not deal with an intentional operation of the driver, for example, an abrupt stop. Another possible technique uses a starter motor that motors the crankshaft of the internal combustion engine without the damper. This technique, however, increases the number of motors included in the driving system and makes the driving system undesirably bulky.

This problem arises in any range that causes a resonance, for example, in the process of stopping the internal combustion engine and during the rotation of the crankshaft by the motor while a fuel supply to the internal combustion engine is stopped.

SUMMARY OF THE INVENTION

One object of the present invention is thus to provide a driving system that can reduce the amplitude of torsional vibrations of the output shaft of the engine.

Another object of the present invention is to enable the driving state to swiftly pass through a specific operation range of the internal combustion engine that causes a resonance.

Still another object of the present invention is to stop motoring the internal combustion engine when a large resonance energy is supplied.

At least part of the above and the other related objects is realized by a first driving system of the present invention, the first driving system comprises: an internal combustion engine connecting with an output shaft via a damper; a motor having a rotating shaft mechanically connected to the output shaft; compression ratio varying means for varying an effective compression ratio of the internal combustion engine; driving state detecting means for detecting a driving state of the internal combustion engine; motor control means for driving and controlling the motor in response to a predetermined driving requirement, in order to motor the internal combustion engine while a fuel supply to the internal combustion engine is stopped; and compression ratio regulation means for, when the driving state of the internal combustion engine detected by the driving state detecting means in the process of motoring by the motor control means is within a predetermined range, regulating the compression ratio varying means to make the effective compression ratio of the internal combustion engine lower in the driving state within the predetermined range than that in the driving state out of the predetermined range.

In the first driving system of the present invention, the predetermined range may include a specific range, in which a system consisting of the internal combustion engine, the damper, and the motor causes a torsional resonance. The compression ratio varying means is, for example, means for regulating an open and close timing of an intake valve of the internal combustion engine.

The first driving system of the present invention decreases the effective compression ratio of the internal combustion engine, thereby decreasing the compression work in the internal combustion engine. This leads to a small variation in torque applied to the output shaft of the internal combustion engine and accordingly reduces the amplitude of the torsional vibrations of the output shaft of the internal combustion engine. The decrease in compression work in the internal combustion engine enables a quick shift of the driving state of the internal combustion engine, thereby allowing the driving state to swiftly pass through the specific operation range that causes a resonance. In the preferable structure that the compression ratio varying means is means for regulating the open and close timing of the intake valve of the internal combustion engine, the effective compression ratio of the internal combustion engine can be varied by regulating the amount of intake air.

In accordance with one aspect of the first driving system of the present invention, the first driving system further comprising: operation starting means for, when the driving state of the internal combustion engine detected by the driving state detecting means reaches a predetermined driving condition after a starting requirement of the internal combustion engine, initiating a fuel supply to the internal combustion engine and ignition, so as to start operation of the internal combustion engine, wherein the predetermined driving requirement is the starting requirement of the internal combustion engine, the predetermined range is included in a certain range from a start of motoring the internal combustion engine to a point at which the driving state of the internal combustion engine reaches the predetermined driving condition. This structure enables the driving state of the internal combustion engine to swiftly pass through the specific range that causes a resonance, in the process of starting the internal combustion engine.

In accordance with another aspect of the first driving system of the present invention, the first driving system further comprising: fuel supply stopping means for stopping a fuel supply to the internal combustion engine, in response to an operation stop requirement of the internal combustion engine, wherein the predetermined driving requirement is the operation stop requirement of the internal combustion engine, the predetermined range is a range from a point at which the driving state of the internal combustion engine detected by the driving state detecting means reaches the predetermined driving condition to a stop of the internal combustion engine. This structure enables the driving state of the internal combustion engine to swiftly pass through the specific range that causes a resonance, in the process of stopping operation of the internal combustion engine.

In accordance with still another aspect of the first driving system of the present invention, the first driving system further comprising: three shaft-type power input/output means having three shafts respectively and mechanically linked with the output shaft, the rotating shaft of the motor, and a drive shaft, when powers are input to and output from any two shafts among the three shafts, the power input/output means inputting and outputting power, which is determined according to the input and output powers, to and from a residual one shaft; and a second motor for inputting and outputting power to and from either one of the output shaft of the internal combustion engine and the drive shaft.

At least part of the above and the other related objects is realized by a second driving system of the present invention, the second driving system comprises: an internal combustion engine connecting with an output shaft via a damper; a motor having a rotating shaft mechanically connected to the output shaft; driving state detecting means for detecting a driving state of the internal combustion engine; and motor control means for driving and controlling the motor in response to a predetermined driving requirement, in order to motor the internal combustion engine while a fuel supply to the internal combustion engine is stopped, wherein the motor control means comprises means for, when the driving state detected by the driving state detecting means is within a predetermined range, driving and controlling the motor, so as to enable the output shaft of the internal combustion engine to rotate at a greater rotational angular acceleration in the driving state within the predetermined range than that in the driving state out of the predetermined range.

The second driving system of the present invention enables a quick shift of the driving state in the predetermined range. When the predetermined range is the specific range that causes a resonance, this structure enables the driving state of the internal combustion engine to swiftly pass through the specific range that causes a resonance.

In accordance with one aspect of the second driving system of the present invention, the second driving system further comprising: operation starting means for, when the driving state of the internal combustion engine detected by the driving state detecting means reaches a predetermined driving condition after a starting requirement of the internal combustion engine, initiating a fuel supply to the internal combustion engine and ignition, so as to start operation of the internal combustion engine, wherein the predetermined driving requirement is the starting requirement of the internal combustion engine, the predetermined range is included in a certain range from a start of motoring the internal combustion engine to a point at which the driving state of the internal combustion engine reaches the predetermined driving condition. This structure enables the driving state of the internal combustion engine to swiftly pass through the specific range that causes a resonance, in the process of starting the internal combustion engine.

In accordance with another aspect of the second driving system of the present invention, the second driving system further comprising: fuel supply stopping means for stopping a fuel supply to the internal combustion engine prior to motoring the internal combustion engine by the motor control means, in response to an operation stop requirement of the internal combustion engine, wherein the predetermined driving requirement is the operation stop requirement of the internal combustion engine, the predetermined range is a range from a point at which the driving state of the internal combustion engine detected by the driving state detecting means reaches the predetermined driving condition to a stop of the internal combustion engine. This structure enables the driving state of the internal combustion engine to swiftly pass through the specific range that causes a resonance, in the process of stopping operation of the internal combustion engine.

In accordance with still another aspect of the second driving system of the present invention, the second driving system further comprising: three shaft-type power input/output means having three shafts respectively and mechanically linked with the output shaft, the rotating shaft of the motor, and a drive shaft, when powers are input to and output from any two shafts among the three shafts, the power input/output means inputting and outputting power, which is determined according to the input and output powers, to and from a residual one shaft; and a second motor for inputting and outputting power to and from either one of the output shaft of the internal combustion engine and the drive shaft.

At least part of the above and the other related objects is realized by a third driving system of the present invention, the third driving system comprises: an internal combustion engine connecting with an output shaft via a damper; a motor having a rotating shaft mechanically connected to the output shaft; motor control means for driving and controlling the motor in response to a predetermined driving requirement, in order to motor the internal combustion engine while a fuel supply to the internal combustion engine is stopped; resonance energy measuring means for measuring resonance energy of a torsion of a system comprising the internal combustion engine, the damper, and the motor; and motoring stop means for, when the resonance energy measured by the resonance energy measuring means is not less than a predetermined value, driving and controlling the motor to stop motoring the internal combustion engine, irrespective of the control of the motor by the motor control means.

The third driving system of the present invention stops motoring the internal combustion engine when the resonance energy becomes equal to or greater than the predetermined value. This structure prevents a further increase in resonance energy and thereby avoids the troubles due to the resonance, such as a foreign noise and destruction. The predetermined driving requirement includes, for example, a starting requirement of the internal combustion engine.

In accordance with one aspect of the third driving system of the present invention, the third driving system further comprising: three shaft-type power input/output means having three shafts respectively and mechanically linked with the output shaft, the rotating shaft of the motor, and a drive shaft, when powers are input to and output from any two shafts among the three shafts, the power input/output means inputting and outputting power, which is determined according to the input and output powers, to and from a residual one shaft; and a second motor for inputting and outputting power to and from either one of the output shaft of the internal combustion engine and the drive shaft.

At least part of the above and the other related objects is realized by a fourth driving system of the present invention, the fourth driving system comprises: an internal combustion engine connecting with an output shaft via a damper; a motor having a rotating shaft mechanically connected to the output shaft; motor control means for driving and controlling the motor in response to a predetermined driving requirement, in order to motor the internal combustion engine while a fuel supply to the internal combustion engine is stopped; driving state detecting means for detecting a driving state of the internal combustion engine; time counting means for counting a time period for which the driving state detected by the driving state detecting means is continuously kept in a predetermined range; and motoring stop means for, when the time period counted by the time counting means is not shorter than a predetermined time period, driving and controlling the motor to stop motoring the internal combustion engine, irrespective of the control of the motor by the motor control means.

The fourth driving system of the present invention effectively prevents the driving state of the internal combustion engine from being kept within the predetermined range for a predetermined time period or longer. When the predetermined range includes the specific range, in which the system consisting of the internal combustion engine, the damper, and the motor causes a resonance of a torsion, the structure of this driving system prevents the driving state of the internal combustion engine from being kept within the specific range that causes a resonance for a predetermined time period or longer. This avoids the troubles due to the resonance, such as a foreign noise and destruction. The predetermined driving requirement includes, for example, a starting requirement of the internal combustion engine. In the fourth driving system, the predetermined range may include the specific range, in which the system consisting of the internal combustion engine, the damper, and the motor causes a torsional resonance.

In accordance with one aspect of the fourth driving system of the present invention, the third driving system further comprising: three shaft-type power input/output means having three shafts respectively and mechanically linked with the output shaft, the rotating shaft of the motor, and a drive shaft, when powers are input to and output from any two shafts among the three shafts, the power input/ output means inputting and outputting power, which is determined according to the input and output powers, to and from a residual one shaft; and a second motor for inputting and outputting power to and from either one of the output shaft of the internal combustion engine and the drive shaft.

These and other objects, features, aspects, and advantages of the present invention will become more apparent from the following detailed description of the preferred embodiments with the accompanying drawings.

DESCRIPTION OF THE PREFERRED EMBODIMENTS

Figure 1:
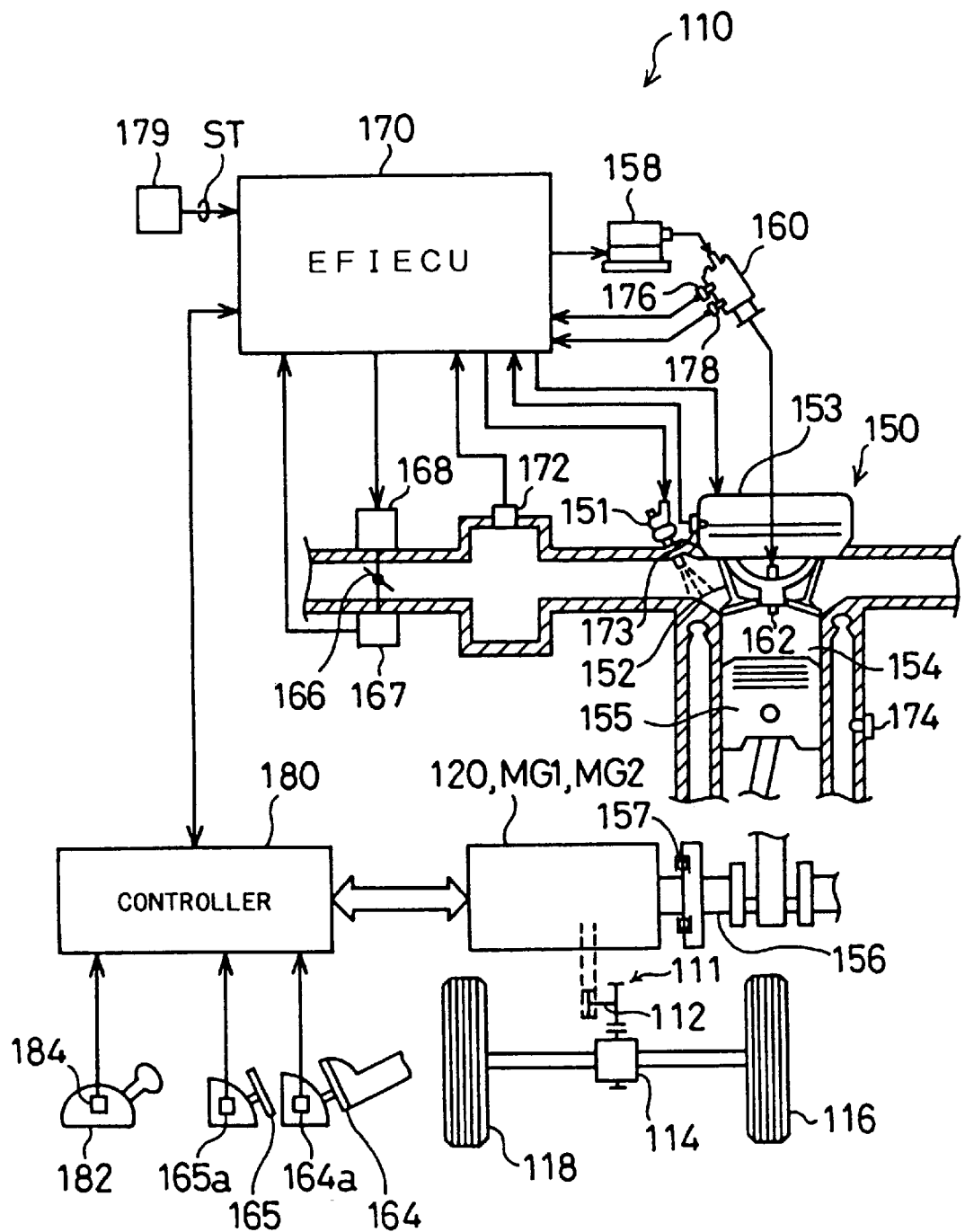
FIG. 1 is a schematic view illustrating general structure of a vehicle with a power output apparatus 110 embodying the present invention incorporated therein.

Some modes of carrying out the present invention are described as preferred embodiments. FIG. 1 is a schematic view illustrating general structure of a vehicle with a power output apparatus 110 embodying the present invention incorporated therein. Referring to FIG. 1, the vehicle is provided with an engine 150 which consumes gasoline as a fuel and outputs power. The air ingested from an air supply system via a throttle valve 166 is mixed with a fuel, that is, gasoline in this embodiment, injected from a fuel injection valve 151. The air/fuel mixture is supplied into a combustion chamber 154 via an intake valve 152 to be explosively ignited and burned. Linear motion of a piston 155 pressed down by the explosion of the air/fuel mixture is converted to rotational motion of a crankshaft 156. The throttle valve 166 is driven to open and close by an actuator 168. An ignition plug 162 converts a high voltage applied from an igniter 158 via a distributor 160 to a spark, which explosively ignites and combusts the air/fuel mixture.

The engine 150 includes an open and close timing change mechanism 153 for varying the open and close timing of the intake valve 152. The open and close timing change mechanism 153 leads or lags the phase of an intake cam shaft (not shown) for opening and closing the intake valve 152 relative to the crank angle, thereby regulating the open and close timing of the intake valve 152. An electronic control unit 170 (described below) carries out a feedback control based on a signal output from a cam shaft position sensor 173 that measures the position of the intake cam shaft, and determines the lead and the lag of the phase of the intake cam shaft.

Operation of the engine 150 is controlled by the electronic control unit (hereinafter referred to as EFIECU) 170. The EFIECU 170 receives information from various sensors, which detect operating conditions of the engine 150. These sensors include a throttle valve position sensor 167 for detecting a valve travel or position of the throttle valve 166, a manifold vacuum sensor 172 for measuring a load applied to the engine 150, the cam shaft position sensor 173 for measuring the position of the intake cam shaft, a water temperature sensor 174 for measuring the temperature of cooling water in the engine 150, and a speed sensor 176 and an angle sensor 178 mounted on the distributor 160 for measuring the revolving speed (the number of revolutions per a predetermined time period) and the rotational angle of the crankshaft 156. A starter switch 179 for detecting a starting condition ST of an ignition key (not shown) is also connected to the EFIECU 170. Other sensors and switches connecting with the EFIECU 170 are omitted from the illustration.

The crankshaft 156 of the engine 150 is linked with a planetary gear 120, a first motor MG1, and a second motor MG2 (described later) via a damper 157 that reduces the amplitude of torsional vibrations occurring on the crankshaft 156. The crankshaft 156 is further connected to a differential gear 114 via a power transmission gear 111, which is linked with a drive shaft 112 working as the rotating shaft of the power transmission gear 111. The power output from the power output apparatus 110 is thus eventually transmitted to left and right driving wheels 116 and 118. The first motor MG1 and the second motor MG2 are electrically connected to and controlled by a controller 180. The controller 180 includes an internal control CPU and receives inputs from a gearshift position sensor 184 attached to a gearshift 182, an accelerator position sensor 164a attached to an accelerator pedal 164, and a brake pedal position sensor 165a attached to a brake pedal 165, as described later in detail. The controller 180 sends and receives a variety of data and information to and from the EFIECU 170 through communication. Details of the control procedure including a communication protocol will be described later.

Figure 2:
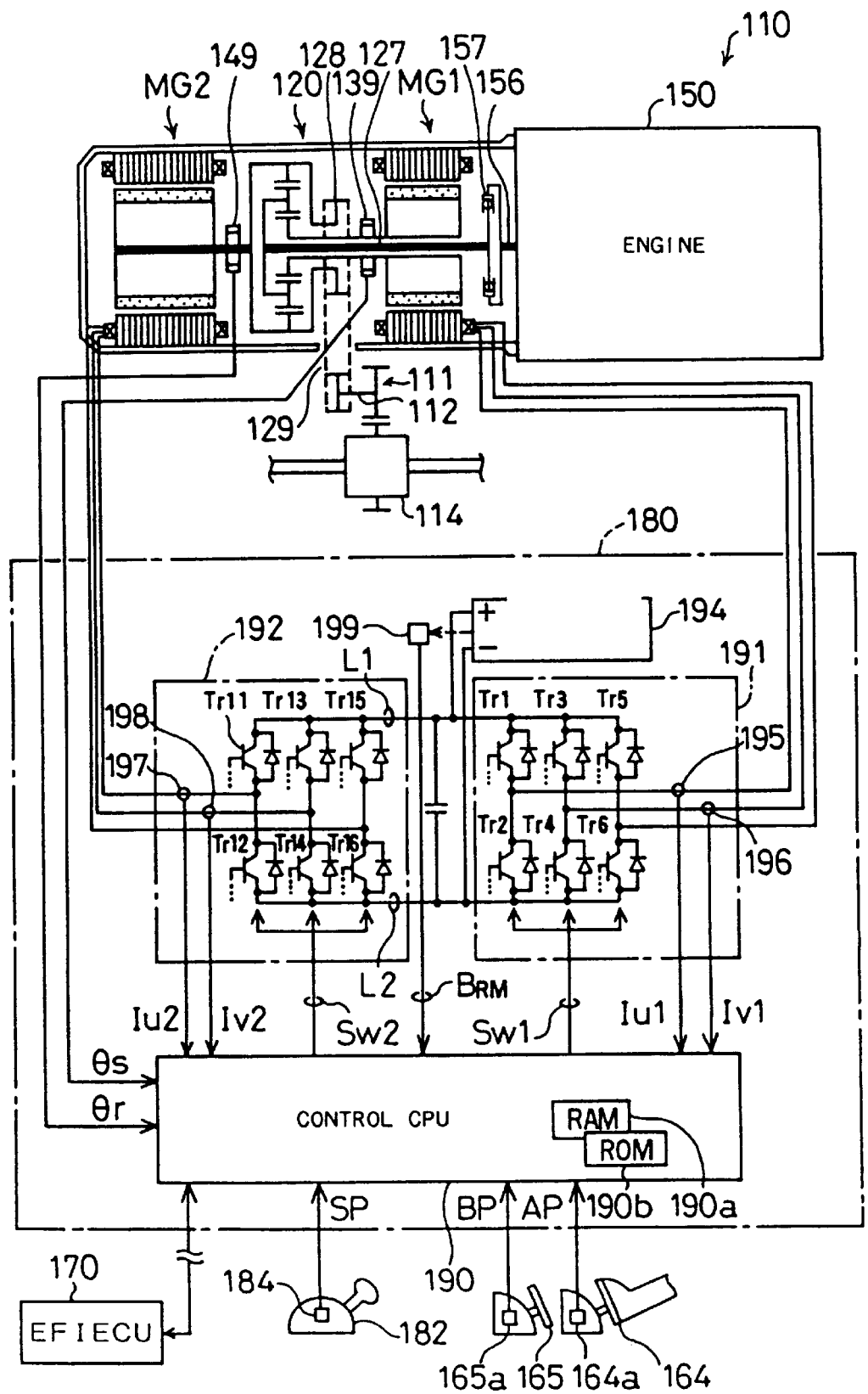
FIG. 2 illustrates the power output apparatus 110 of the embodiment including a planetary gear 120, a first motor MG1, a second motor MG2, and a controller 180.

FIG. 2 illustrates the power output apparatus 110 of the embodiment including the planetary gear 120, the first motor MG1, the second motor MG2, and the controller 180. Referring to FIG. 2, the power output apparatus 110 of the embodiment primarily includes the engine 150, the damper 157 for connecting the crankshaft 156 of the engine 150 to a carrier shaft 127 so as to reduce the amplitude of the torsional vibrations of the crankshaft 156, the planetary gear 120 having a planetary carrier 124 linked with the carrier shaft 127, the first motor MG1 linked with a sun gear 121 of the planetary gear 120, the second motor MG2 linked with a ring gear 122 of the planetary gear 120, and the controller 180 for driving and controlling the first and the second motors MG1 and MG2.

Figure 3:
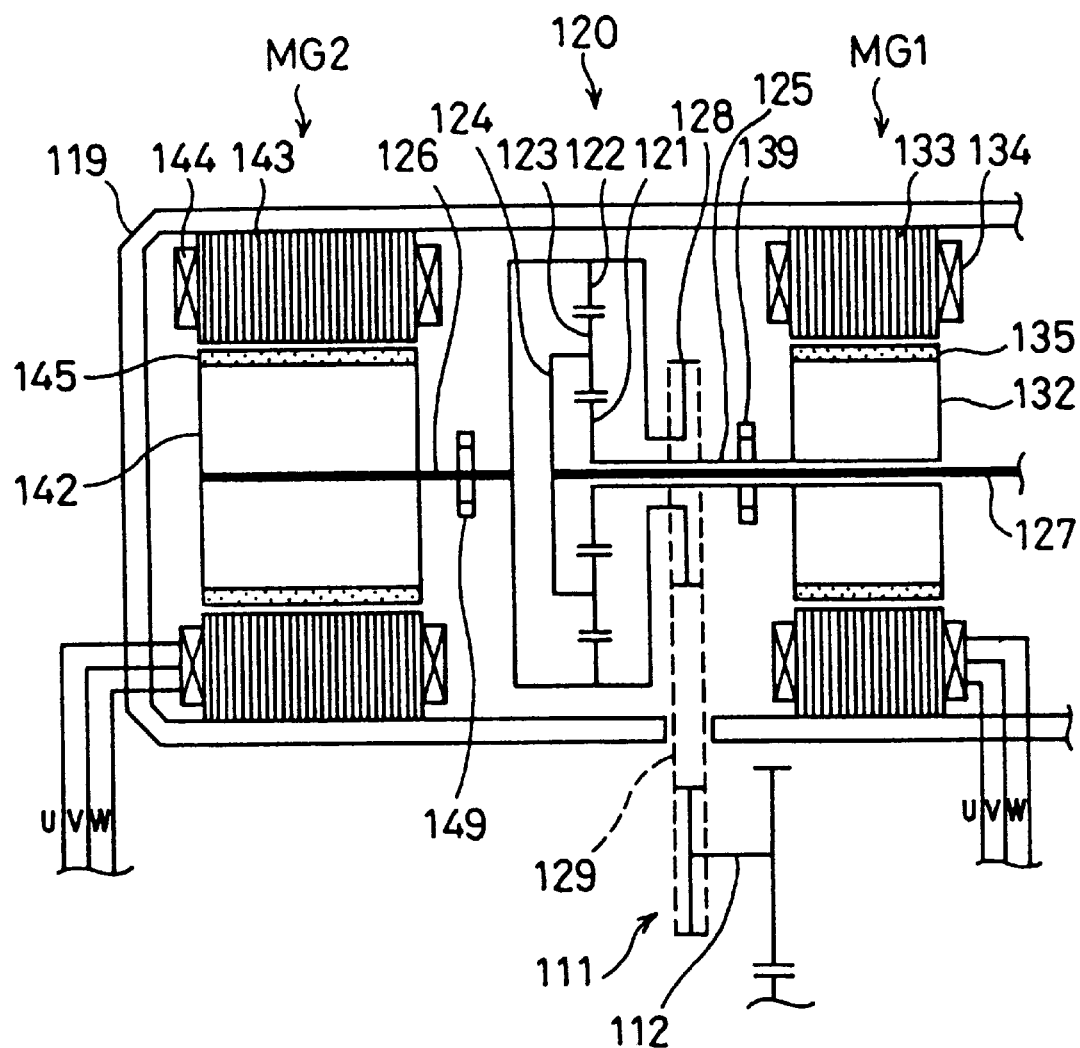
FIG. 3 is an enlarged view illustrating the planetary gear 120, the first motor MG1, and the second motor MG2 included in the power output apparatus 110 of the embodiment.

FIG. 3 is an enlarged view illustrating the planetary gear 120, the first motor MG1, and the second motor MG2 included in the power output apparatus 110. Referring to FIG. 3, the planetary gear 120 includes the sun gear 121 linked with a hollow sun gear shaft 125 which the carrier shaft 127 passes through, the ring gear 122 linked with a ring gear shaft 126 coaxial with the crankshaft 156, a plurality of planetary pinion gears 123 arranged between the sun gear 121 and the ring gear 122 to revolve around the sun gear 121 while rotating on its axis, and the planetary carrier 124 connecting with one end of the carrier shaft 127 to support the rotating shafts of the planetary pinion gears 123. In the planetary gear 120, three shafts, that is, the sun gear shaft 125, the ring gear shaft 126, and the carrier shaft 127 respectively connecting with the sun gear 121, the ring gear 122, and the planetary carrier 124, work as input and output shafts of the power. Determination of the power input to or output from any two shafts among the three shafts automatically determines the power input to or output from the residual one shaft. The details of the input and output operations of the power into or from the three shafts of the planetary gear 120 will be discussed later.

A power feed gear 128 for taking out the power is linked with the ring gear 122 and arranged on the side of the first motor MG1. The power feed gear 128 is further connected to the power transmission gear 111 via a chain belt 129, so that the power is transmitted between the power feed gear 128 and the power transmission gear 111.

The first motor MG1 is constructed as a synchronous motor-generator and includes a rotor 132 having a plurality of permanent magnets 135 on its outer surface and a stator 133 having three-phase coils 134 wound thereon to form a revolving magnetic field. The rotor 132 is linked with the sun gear shaft 125 connecting with the sun gear 121 of the planetary gear 120. The stator 133 is prepared by laying thin plates of non-directional electromagnetic steel one upon another and is fixed to a casing 119. The first motor MG1 works as a motor for rotating the rotor 132 through the interaction between a magnetic field produced by the permanent magnets 135 and a magnetic field produced by the three-phase coils 134, or as a generator for generating an electromotive force on either ends of the three-phase coils 134 through the interaction between the magnetic field produced by the permanent magnets 135 and the rotation of the rotor 132. The sun gear shaft 125 is further provided with a resolver 139 for measuring its rotational angle θs.

Like the first motor MG1, the second motor MG2 is also constructed as a synchronous motor-generator and includes a rotor 142 having a plurality of permanent magnets 145 on its outer surface and a stator 143 having three-phase coils 144 wound thereon to form a revolving magnetic field. The rotor 142 is linked with the ring gear shaft 126 connecting with the ring gear 122 of the planetary gear 120, whereas the stator 14 is fixed to the casing 119. The stator 143 of the motor MG2 is also produced by laying thin plates of non-directional electromagnetic steel one upon another. Like the first motor MG1, the second motor MG2 also works as a motor or a generator. The ring gear shaft 126 is further provided with a resolver 149 for measuring its rotational angle θr.

The controller 180 for driving and controlling the first and the second motor MG1 and MG2 has the following configuration. Referring back to FIG. 2, the controller 180 includes a first driving circuit 191 for driving the first motor MG1, a second driving circuit 192 for driving the second motor MG2, a control CPU 190 for controlling both the first and the second driving circuits 191 and 192, and a battery 194 including a number of secondary cells. The control CPU 190 is a one-chip microprocessor including a RAM 190a used as a working memory, a ROM 190b in which various control programs are stored, an input/output port (not shown), and a serial communication port (not shown) through which data are sent to and received from the EFIECU 170.

The control CPU 190 receives a variety of data via the input port. The input data include a rotational angle θs of the sun gear shaft 125 measured with the resolver 139, a rotational angle θr of the ring gear shaft 126 measured with the resolver 149, an accelerator pedal position AP (step-on amount of the accelerator pedal 164) output from the accelerator position sensor 164a, a brake pedal position BP (step-on amount of the brake pedal 165) output from the brake pedal position sensor 165a, a gearshift position SP output from the gearshift position sensor 184, values of currents Iu1 and Iv1 from two ammeters 195 and 196 disposed in the first driving circuit 191, values of currents Iu2 and Iv2 from two ammeters 197 and 198 disposed in the second driving circuit 192, and a remaining charge BRM of the battery 194 measured with a remaining charge meter 199. The remaining charge meter 199 may determine the remaining charge BRM of the battery 194 by any known method; for example, by measuring the specific gravity of an electrolytic solution in the battery 194 or the whole weight of the battery 194, by computing the currents and time of charge and discharge, or by causing an instantaneous short circuit between terminals of the battery 194 and measuring an internal resistance against the electric current.

The control CPU 190 outputs a first control signal SW1 for driving six transistors Tr1 through Tr6 working as switching elements of the first driving circuit 191 and a second control signal SW2 for driving six transistors Tr11 through Tr16 working as switching elements of the second driving circuit 192. The six transistors Tr1 through Tr6 in the first driving circuit 191 constitute a transistor inverter and are arranged in pairs to work as a source and a drain with respect to a pair of power lines L1 and L2. The three-phase coils (U,V,W) 134 of the first motor MG1 are connected to the respective contacts of the paired transistors in the first driving circuit 191. The power lines L1 and L2 are respectively connected to plus and minus terminals of the battery 194. The control signal SW1 output from the control CPU 190 thus successively controls the power-on time of the paired transistors Tr1 through Tr6. The electric currents flowing through the three-phase coils 134 undergo PWM (pulse width modulation) control to give quasi-sine waves, which enable the three-phase coils 134 to form a revolving magnetic field.

The six transistors Tr11 through Tr16 in the second driving circuit 192 also constitute a transistor inverter and are arranged in the same manner as the transistors Tr1 through Tr6 in the first driving circuit 191. The three-phase coils (U,V,W) 144 of the second motor MG2 are connected to the respective contacts of the paired transistors in the second driving circuit 191. The second control signal SW2 output from the control CPU 190 thus successively controls the power-on time of the paired transistors Tr11 through Tr16. The electric currents flowing through the three-phase coils 144 undergo PWM control to give quasi-sine waves, which enable the three-phase coils 144 to form a revolving magnetic field.

Figure 4:
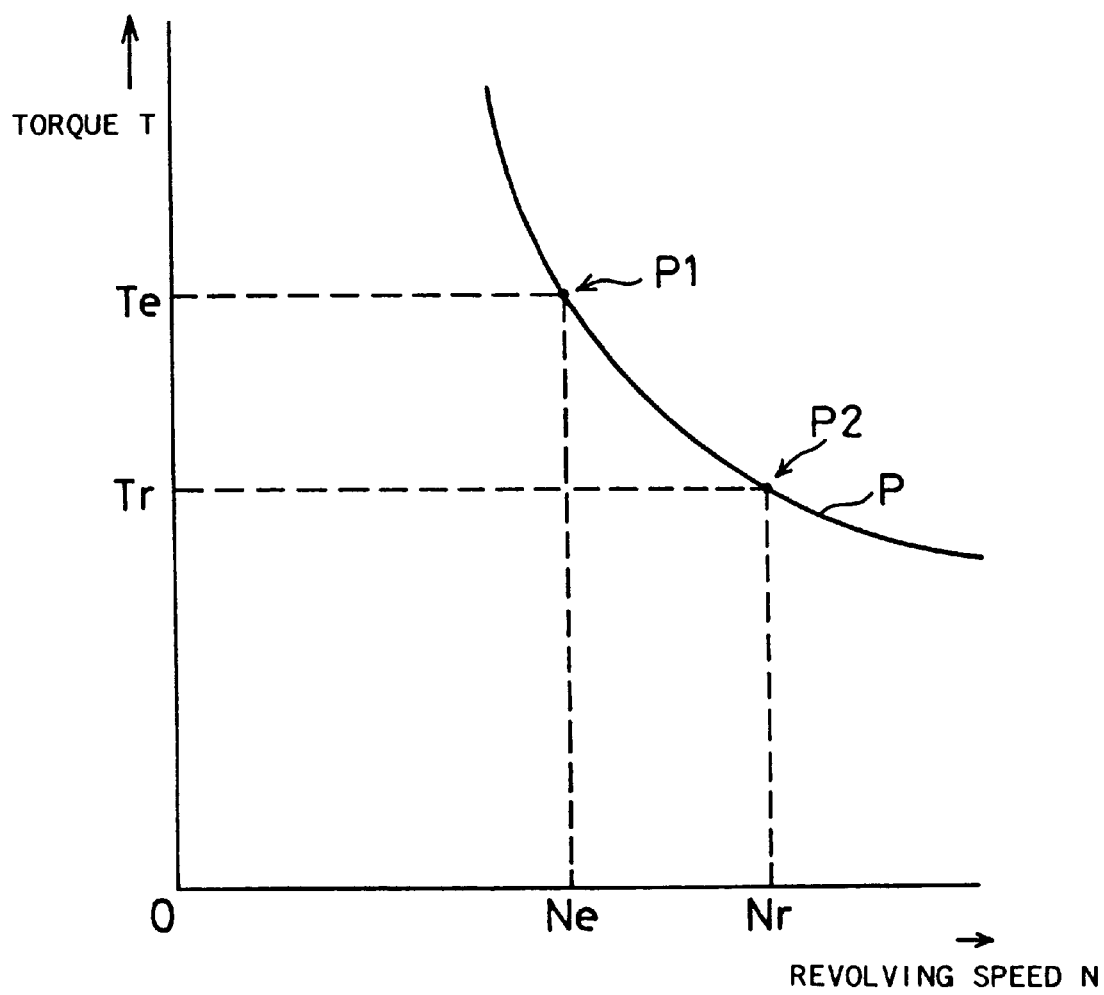
FIG. 4 is a graph showing the operation principle of the power output apparatus 110 of the embodiment.

The power output apparatus 110 of the embodiment thus constructed works in accordance with the operation principles discussed below, especially with the principle of torque conversion. By way of example, it is assumed that the engine 150 is driven at a driving point P1 of the revolving speed Ne and the torque Te and that the ring gear shaft 126 is driven at another driving point P2, which is defined by another revolving speed Nr and another torque Tr but gives an amount of energy identical with an energy Pe output from the engine 150. This means that the power output from the engine 150 is subjected to torque conversion and applied to the ring gear shaft 126. The relationship between the torque and the revolving speed of the engine 150 and the ring gear shaft 126 under such conditions is shown in the graph of FIG. 4.

Figure 5:
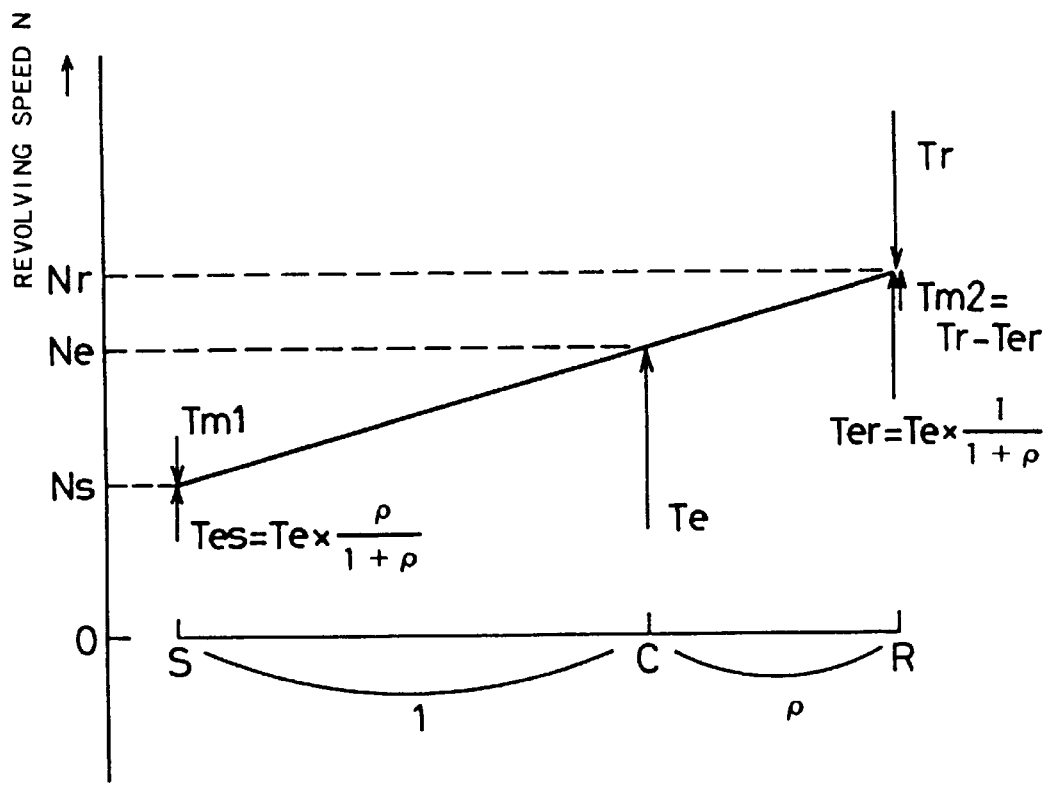
FIG. 5 is a nomogram showing the relationship between the revolving speed and the torque on the three shafts linked with the planetary gear 120.
Figure 6:
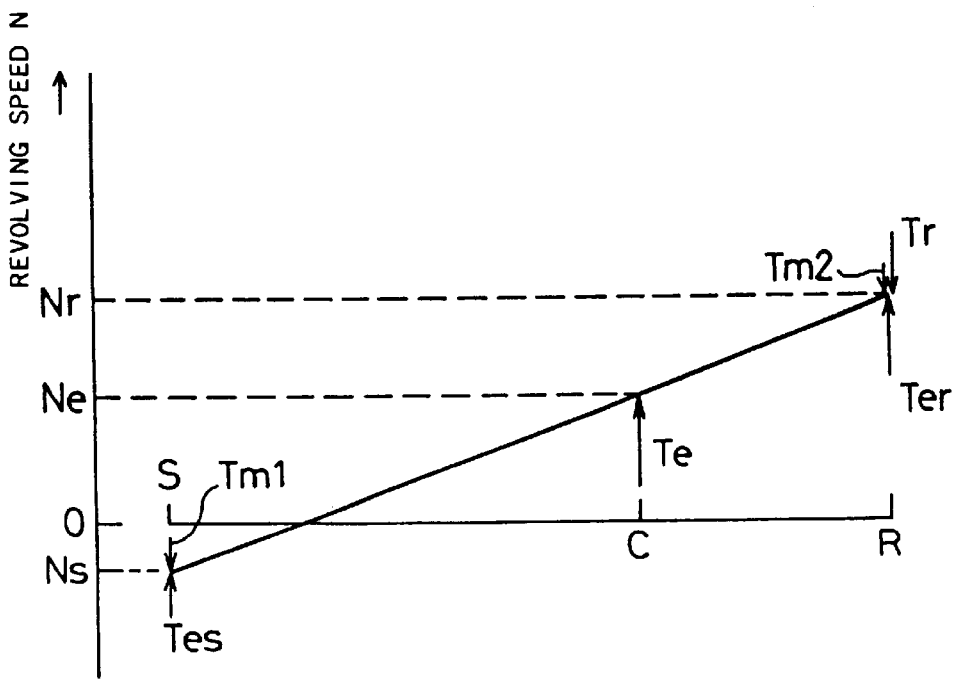
FIG. 6 is a nomogram showing the relationship between the revolving speed and the torque on the three shafts linked with the planetary gear 120.

According to the mechanics, the relationship between the revolving speed and the torque of the three shafts in the planetary gear 120 (that is, the sun gear shaft 125, the ring gear shaft 126, and the carrier shaft 127) can be expressed as nomograms illustrated in FIGS. 5 and 6 and solved geometrically. The relationship between the revolving speed and the torque of the three shafts in the planetary gear 120 may be analyzed numerically through calculation of energies of the respective shafts, without using the nomograms. For the clarity of explanation, the nomograms are used in this embodiment.

In the graph of FIG. 5, the revolving speed of the three shafts is plotted as ordinate and the positional ratio of the coordinate axes of the three shafts as abscissa. When a coordinate axis S of the sun gear shaft 125 and a coordinate axis R of the ring gear shaft 126 are positioned on either ends of a line segment, a coordinate axis C of the carrier shaft 127 is given as an interior division of the axes S and R at the ratio of 1 to ρ, where ρ represents a ratio of the number of teeth of the ring gear 122 to that of the sun gear 121 and expressed as Equation (1) given below:

$$\rho = \frac{\text{number of teeth of sun gear}}{\text{number of teeth of ring gear}} \quad (1)$$

As mentioned above, the engine 150 is driven at the revolving speed Ne, while the ring gear shaft 126 is driven at the revolving speed Nr. The revolving speed Ne of the engine 150 can thus be plotted on the coordinate axis C of the carrier shaft 127 linked with the crankshaft 156 of the engine 150, and the revolving speed Nr of the ring gear shaft 126 on the coordinate axis R of the ring gear shaft 126. A straight line passing through both the points is drawn, and a revolving speed Ns of the sun gear shaft 125 is then given as the intersection of this straight line and the coordinate axis S. This straight line is hereinafter referred to as dynamic collinear line. The revolving speed Ns of the sun gear shaft 125 can be calculated from the revolving speed Ne of the engine 150 and the revolving speed Nr of the ring gear shaft 126 according to a proportional expression given as Equation (2) below. In the planetary gear 120, the determination of the rotations of the two gears among the sun gear 121, the ring gear 122, and the planetary carrier 124 results in automatically setting the rotation of the residual one gear.

$$Ns = Nr - (Nr - Ne)\frac{1+\rho}{\rho} \quad (2)$$

The torque Te of the engine 150 is then applied (upward in the drawing) to the dynamic collinear line on the coordinate axis C of the carrier shaft 127 functioning as a line of action. The dynamic collinear line against the torque can be handled as a rigid body to which a force is applied as a vector. Based on the technique of dividing the force into different lines of action having the same direction, the torque Te acting on the coordinate axis C is divided into a torque Tes on the coordinate axis S and a torque Ter on the coordinate axis R. The magnitudes of the torques Tes and Ter are given by Equations (3) and (4) below:

$$Tes = Te \times \frac{\rho}{1+\rho} \quad (3)$$

$$Ter = Te \times \frac{1}{1+\rho} \quad (4)$$

The equilibrium of forces on the dynamic collinear line is essential for the stable state of the dynamic collinear line. In accordance with a concrete procedure, a torque Tm1 having the same magnitude as but the opposite direction to the torque Tes is applied to the coordinate axis S, whereas a torque Tm2 having the same magnitude as but the opposite direction to a resultant force of the torque Ter and the torque that has the same magnitude as but the opposite direction to the torque Tr output to the ring gear shaft 126 is applied to the coordinate axis R. The torque Tm1 is given by the first motor MG1, and the torque Tm2 by the second motor MG2. The first motor MG1 applies the torque Tm1 in reverse of its rotation and thereby works as a generator to regenerate an electrical energy Pm1, which is given as the product of the torque Tm1 and the revolving speed Ns, from the sun gear shaft 125. The second motor MG2 applies the torque Tm2 in the direction of its rotation and thereby works as a motor to output an electrical energy or power Pm2, which is given as the product of the torque Tm2 and the revolving speed Nr, to the ring gear shaft 126.

In case that the electrical energy Pm1 is identical with the electrical energy Pm2, all the electric power consumed by the second motor MG2 can be supplied by the electric power regenerated by the first motor MG1. In order to attain such a state, all the input energy should be output; that is, the energy Pe output from the engine 150 should be equal to an energy Pr output to the ring gear shaft 126. Namely the energy Pe expressed as the product of the torque Te and the revolving speed Ne is made equal to the energy Pr expressed as the product of the torque Tr and the revolving speed Nr. Referring to FIG. 4, the power that is expressed as the product of the torque Te and the revolving speed Ne and output from the engine 150 driven at the driving point P1 is subjected to torque conversion and output to the ring gear shaft 126 as the power of the same energy but expressed as the product of the torque Tr and the revolving speed Nr. As discussed previously, the power output to the ring gear shaft 126 is transmitted to a drive shaft 112 via the power feed gear 128 and the power transmission gear 111, and further transmitted to the driving wheels 116 and 118 via the differential gear 114. A linear relationship is accordingly held between the power output to the ring gear shaft 126 and the power transmitted to the driving wheels 116 and 118. The power transmitted to the driving wheels 116 and 118 can thus be controlled by adjusting the power output to the ring gear shaft 126.

Although the revolving speed Ns of the sun gear shaft 125 is positive in the nomogram of FIG. 5, it may be negative according to the revolving speed Ne of the engine 150 and the revolving speed Nr of the ring gear shaft 126 as shown in the nomogram of FIG. 6. In the latter case, the first motor MG1 applies the torque in the direction of its rotation and thereby works as a motor to consume the electrical energy Pm1 given as the product of the torque Tm1 and the revolving speed Ns. The second motor MG2, on the other hand, applies the torque in reverse of its rotation and thereby works as a generator to regenerate the electrical energy Pm2, which is given as the product of the torque Tm2 and the revolving speed Nr, from the ring gear shaft 126. In case that the electrical energy Pm1 consumed by the first motor MG1 is made equal to the electrical energy Pm2 regenerated by the second motor MG2 under such conditions, all the electric power consumed by the first motor MG1 can be supplied by the electric power regenerated by the second motor MG2.

The operation principle discussed above is on the assumption that the efficiency of power conversion by the planetary gear 120, the motors MG1 and MG2, and the transistors Tr1 through Tr16 is equal to the value '1', which represents 100%. In the actual state, however, the conversion efficiency is less than the value '1', and it is required to make the energy Pe output from the engine 150 a little greater than the energy Pr output to the ring gear shaft 126 or alternatively to make the energy Pr output to the ring gear shaft 126 a little smaller than the energy Pe output from the engine 150. By way of example, the energy Pe output from the engine 150 may be calculated by multiplying the energy Pr output to the ring gear shaft 126 by the reciprocal of the conversion efficiency. In the state of the nomogram of FIG. 5, the torque Tm2 of the second motor MG2 may be calculated by multiplying the electric power regenerated by the first motor MG1 by the efficiencies of both the motors MG1 and MG2. In the state of the nomogram of FIG. 6, on the other hand, the torque Tm2 of the second motor MG2 may be calculated by dividing the electric power consumed by the first motor MG1 by the efficiencies of both the motors MG1 and MG2. In the planetary gear 120, there is an energy loss or heat loss due to a mechanical friction or the like, though the amount of energy loss is significantly small, compared with the whole amount of energy concerned. The efficiency of the synchronous motors used as the first and the second motors MG1 and MG2 is very close to the value '1'. Known devices such as GTOs applicable to the transistors Tr1 through Tr16 have extremely small ON-resistance. The efficiency of power conversion is thus practically equal to the value '1'. For the matter of convenience, in the following discussion of the embodiment, the efficiency is considered equal to the value '1' (=100%), unless otherwise specified.

The above description refers to the fundamental operation of the power output apparatus 110 of the embodiment. The power output apparatus 110 can, however, perform other operations as well as the above fundamental operation that carries out the torque conversion for all the power output from the engine 150 and outputs the converted torque to the ring gear shaft 126. The possible operations include an operation of adding electrical energy stored in the battery 194 to the power output from the engine 150 and outputting the total energy to the ring gear shaft 126 and another operation of storing part of the power output from the engine 150 into the battery 194 as electrical energy.

Figure 7:
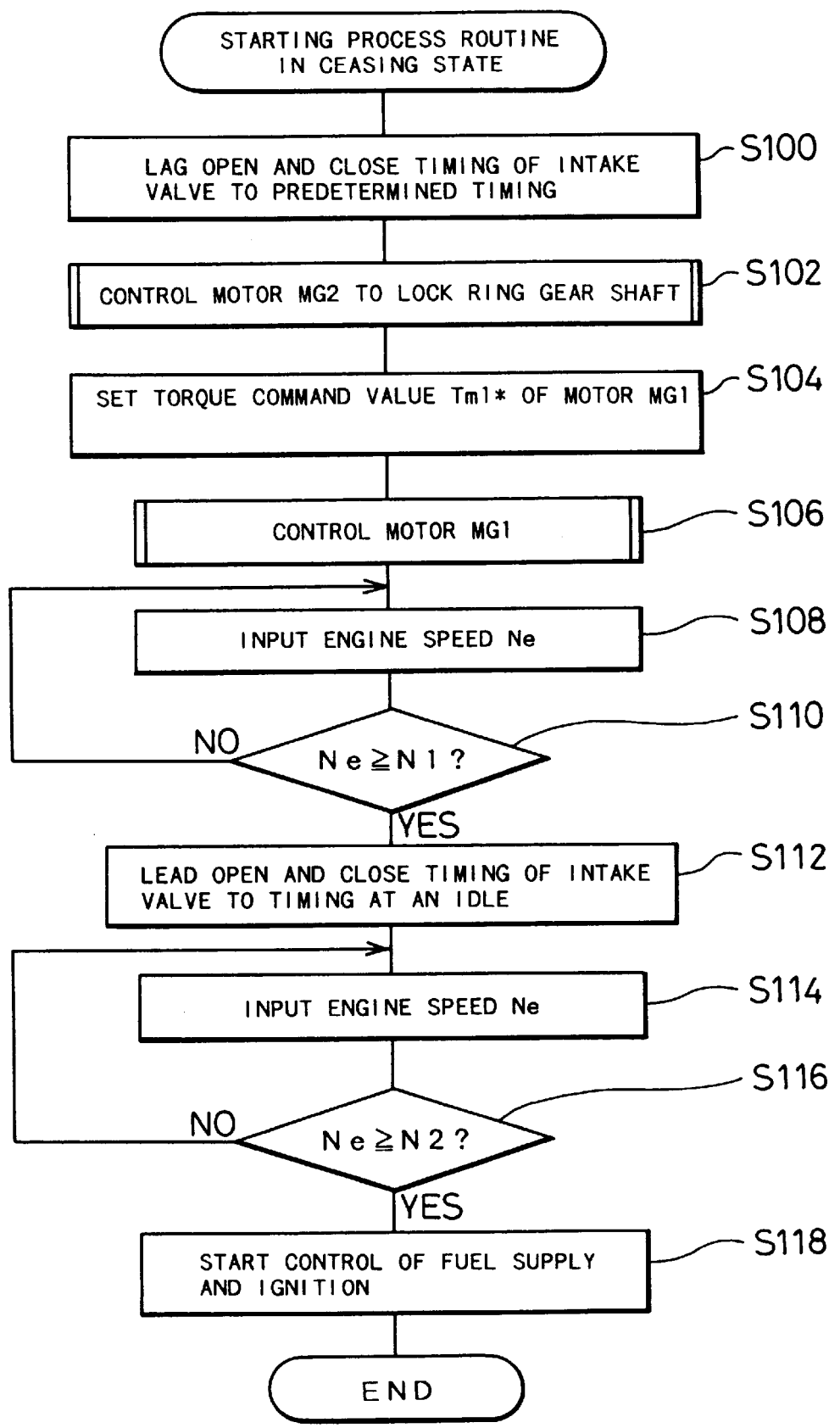
FIG. 7 is a flowchart showing a starting process routine in a ceasing state executed by the control CPU 190 of the controller 180.

The power output apparatus 110 of the embodiment thus constructed carries out a starting operation of the engine 150, which follows a starting process routine in a ceasing state shown in the flowchart of FIG. 7. The starting process routine in the ceasing state is executed in response to an ON operation of the starter switch 179 while the vehicle is at a stop. When the program enters the routine of FIG. 7, the control CPU 190 of the controller 180 first lags the open and close timing of the intake valve 152 to a predetermined timing at step S100. In accordance with a concrete procedure, the control CPU 190 transmits a setting signal to the EFIECU 170 through communication, and the EFIECU 170 receives the setting signal and regulates the phase of the intake cam shaft (not shown) to a preset phase.

The control CPU 190 then controls the second motor MG2 to lock the ring gear shaft 126 at step S102. In accordance with a concrete procedure, in order to prevent the ring gear shaft 126 from being driven and rotated by a torque applied to the ring gear shaft 126 in the process of motoring or cranking the engine 150 by means of the first motor MG1 (described later), a constant electric current that can generate an equivalent torque in the opposite direction is made to flow through the three-phase coils 144 of the second motor MG2. The control CPU 190 subsequently sets a predetermined torque TST to a torque command value Tm1* of the first motor MG1 at step S104, and drives and controls the first motor MG1 in order to enable the preset torque to act on the sun gear shaft 125 linked with the first motor MG1 at step S106. Since the ring gear shaft 126 is locked by the second motor MG2, the torque applied to the sun gear shaft 125 by means of the first motor MG1 is given to the carrier shaft 127 at the gear ratio of $(1+\rho)/\rho$. This torque is applied to the crankshaft 156 of the engine 150 via the damper 157, thereby motoring the engine 150. The predetermined torque TST set to the torque command value Tm1* of the first motor MG1 represents a torque that can drive the engine 150 at a predetermined revolving speed while a supply of fuel stops. In the starting process routine in the ceasing state of the embodiment, the predetermined torque TST represents a torque that can drive the engine 150 at a revolving speed that is a little greater than an idle revolving speed while the open and close timing of the intake valve 152 is not lagged.

Figure 8:
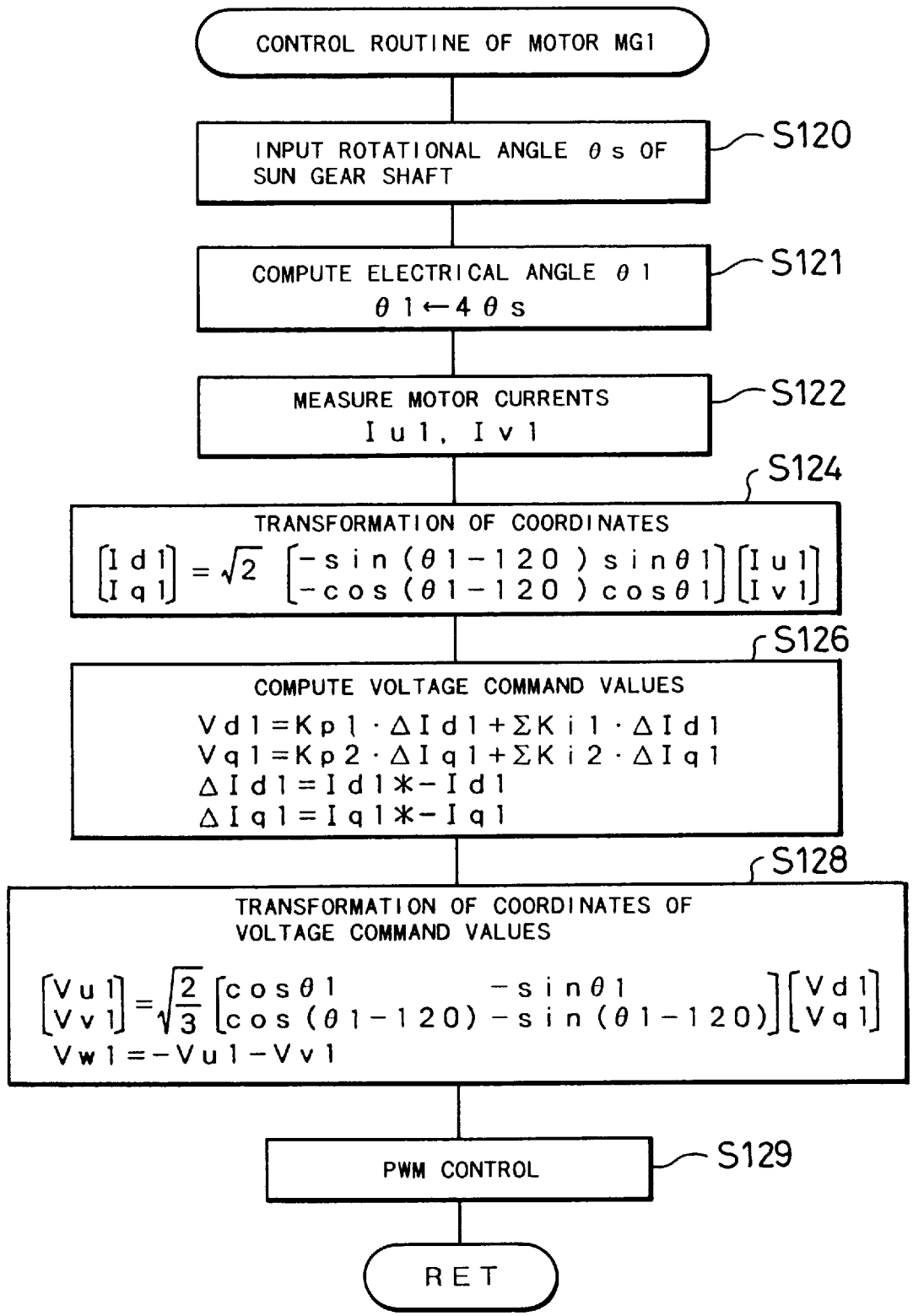
FIG. 8 is a flowchart showing a control routine of the first motor MG1 executed by the control CPU 190 of the controller 180.

The actual control operation of the first motor MG1 executed at step S106 follows a control routine of the first motor MG1 shown in the flowchart of FIG. 8. When the program enters the routine of FIG. 8, the control CPU 190 first receives the rotational angle θs of the sun gear shaft 125 from the revolver 139 at step S120, and calculates an electrical angle θ1 of the first motor MG1 from the rotational angle θs of the sun gear shaft 125 at step S121. In this embodiment, since a synchronous motor of four-pole pair (that is, four N poles and four S poles) is used as the first motor MG1, the rotational angle θs of the sun gear shaft 125 is quadrupled to yield the electrical angle θ1 (θ1=4θs). The CPU 190 then detects values of currents Iu1 and Iv1 flowing through the U phase and V phase of the three-phase coils 134 in the first motor MG1 with the ammeters 195 and 196 at step S122. Although the currents naturally flow through all the three phases U, V, and W, measurement is required only for the currents passing through the two phases since the sum of the currents is equal to zero. At subsequent step S124, the control CPU 190 executes transformation of coordinates (three-phase to two-phase transformation) using the values of currents flowing through the three phases obtained at step S122. The transformation of coordinates maps the values of currents flowing through the three phases to the values of currents passing through d and q axes of the permanent magnet-type synchronous motor and is executed according to Equation (5) given below. The transformation of coordinates is carried out because the currents flowing through the d and q axes are essential for the torque control in the permanent magnet-type synchronous motor. Alternatively, the torque control may be executed directly with the currents flowing through the three phases.

$$\begin{bmatrix} Id1 \\ Iq1 \end{bmatrix} = \sqrt{2} \begin{bmatrix} -\sin(\theta 1 - 120) & \sin\theta 1 \\ -\cos(\theta 1 - 120) & \cos\theta 1 \end{bmatrix} \begin{bmatrix} Iu1 \\ Iv1 \end{bmatrix} \quad (5)$$

After the transformation to the currents of two axes, the control CPU 190 computes deviations of currents Id1 and Iq1 actually flowing through the d and q axes from current command values Id1* and Iq1* of the respective axes, which are calculated from the torque command value Tm1* of the first motor MG1, and subsequently determines voltage command values Vd1 and Vq1 with respect to the d and q axes at step S126. In accordance with a concrete procedure, the control CPU 190 executes arithmetic operations of Equations (6) and Equations (7) given below. In Equations (7), Kp1, Kp2, Ki1, and Ki2 represent coefficients, which are adjusted to be suited to the characteristics of the motor applied. Each voltage command value Vd1 (Vq1) includes a part in proportion to the deviation ΔI from the current command value I* (the first term on the right side of Equation (7)) and a summation of historical data of the deviations ΔI for 'i' times (the second term on the right side).

$$\Delta Id1 = Id1^* - Id1$$

$$\Delta Iq1 = Iq1^* - Iq1 \quad (6)$$

$$Vd1 = Kp1 \cdot \Delta Id1 + \Sigma Ki1 \cdot \Delta Id1$$

$$Vq1 = Kp2 \cdot \Delta Iq1 + \Sigma Ki2 \cdot \Delta Iq1 \quad (7)$$

The control CPU 190 then re-transforms the coordinates of the voltage command values thus obtained (two-phase to three-phase transformation) at step S128. This corresponds to an inverse of the transformation executed at step S124. The inverse transformation determines voltages Vu1, Vv1, and Vw1 actually applied to the three-phase coils 134 as expressed by Equations (8) given below:

$$\begin{bmatrix} Vu1 \\ Vv1 \end{bmatrix} = \sqrt{\frac{2}{3}} \begin{bmatrix} \cos\theta1 & -\sin\theta1 \\ \cos(\theta1-120) & -\sin(\theta1-120) \end{bmatrix} \begin{bmatrix} Vd1 \\ Vq1 \end{bmatrix} \quad (8)$$

$$Vw1 = -Vu1 - Vv1$$

The actual voltage control is accomplished by on-off operation of the transistors Tr1 through Tr6 in the first driving circuit 191. At step S129, the on- and off-time of the transistors Tr1 through Tr6 in the first driving circuit 191 is PWM (pulse width modulation) controlled, in order to attain the voltage command values Vu1, Vv1, and Vw1 determined by Equations (8) given above.

It is assumed that the torque command value Tm1* of the first motor MG1 is positive when the torque Tm1 is applied in the direction shown in the nomograms of FIGS. 5 and 6. For an identical positive torque command value Tm1*, the first motor MG1 is controlled to carry out the regenerative operation when the torque command value Tm1* acts in reverse of the rotation of the sun gear shaft 125 as in the state of the nomogram of FIG. 5, and controlled to carry out the power operation when the torque command value Tm1* acts in the direction of rotation of the sun gear shaft 125 as in the state of the nomogram of FIG. 6. For the positive torque command value Tm1*, both the regenerative operation and the power operation of the first motor MG1 implement the identical switching control. In accordance with a concrete procedure, the transistors Tr1 through Tr6 in the first driving circuit 191 are controlled to enable a positive torque to be applied to the sun gear shaft 125 by the combination of the magnetic field generated by the permanent magnets 135 set on the outer surface of the rotor 132 with the revolving magnetic field generated by the currents flowing through the three-phase coils 134. The identical switching control is executed for both the regenerative operation and the power operation of the first motor MG1 as long as the sign of the torque command value Tm1* is not changed. The control routine of the first motor MG1 shown in the flowchart of FIG. 8 is thus applicable to both the regenerative operation and the power operation. When the torque command value Tm1* is negative, the rotational angle θs of the sun gear shaft 125 read at step S120 is varied in a reverse direction. The control routine of the first motor MG1 shown in FIG. 8 is thus also applicable to this case.

Figure 9:
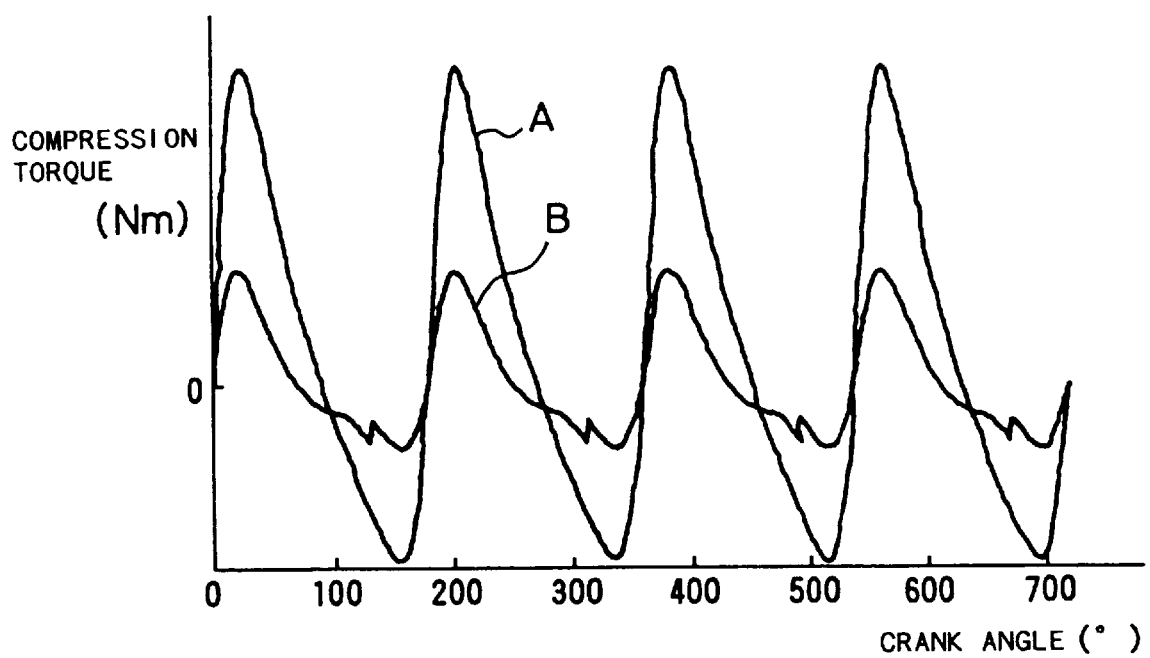
FIG. 9 is a graph showing the relationship between the open and close timing of the intake valve 152 and the compression torque of the engine 150.
Figure 10:
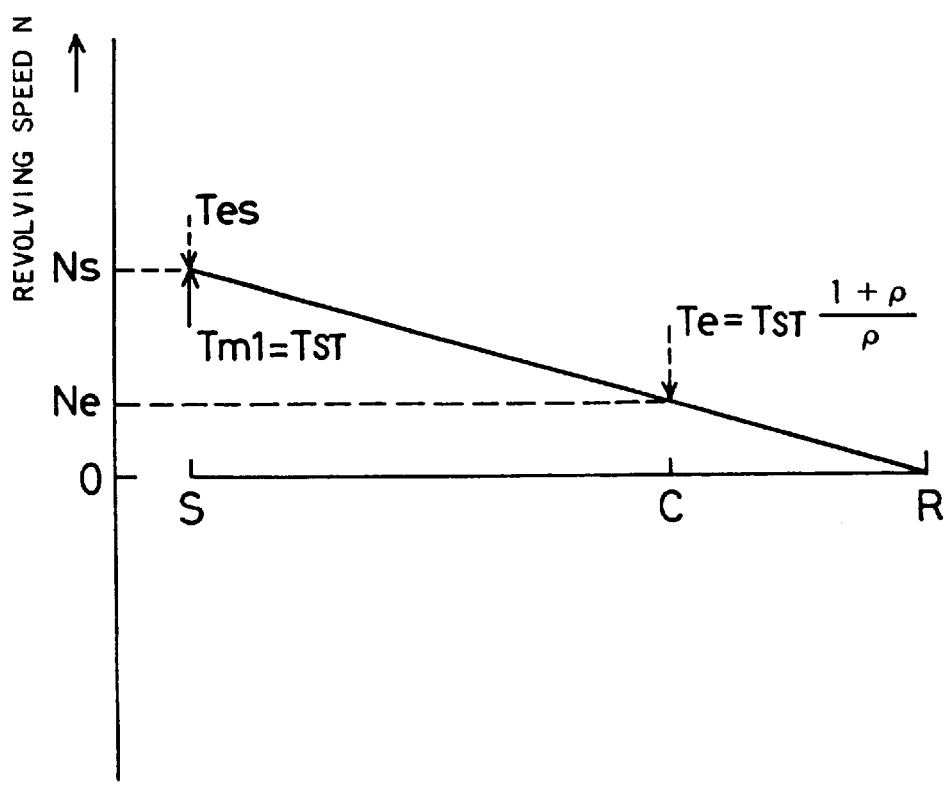
FIG. 10 is a nomogram wherein the engine 150 is kept in the motoring state by means of the first motor MG1.

The control operation of the first motor MG1 discussed above motors or cranks the engine 150. FIG. 9 is a graph showing the relationship between the open and close timing of the intake valve 152 and the compression torque of the engine 150. In the graph of FIG. 9, a curve A shows the compression torque of the engine 150 plotted against the crank angle in case that the open and close timing of the intake valve 152 is neither lagged nor led but is set in the ordinary state. A curve B shows the compression torque of the engine 150 plotted against the crank angle in case that the open and close timing of the intake valve 152 is lagged to a predetermined timing. As clearly understood from the data of FIG. 9, lagging the open and close timing of the intake valve 152 lowers the effective compression ratio of the engine 150 and thereby reduces the amplitude of the compression torque of the engine 150. Namely the lagged open and close timing of the intake valve 152 leads to a reduction of the amplitude of the torsional vibrations occurring on the crankshaft 156 and thereby enables the crankshaft 156 to be driven and rotated smoothly. In this embodiment, the revolving speed of the crankshaft 156 can thus smoothly increase while the amplitude of the torsional vibrations is kept small. FIG. 10 is a nomogram wherein the engine 150 is kept in the motoring state by means of the first motor MG1.

Referring back to the starting process routine in the ceasing state shown in the flowchart of FIG. 7, after controlling the first motor MG1 at step S106, the control CPU 190 receives data of the revolving speed Ne of the engine 150 at step S108 and compares the input revolving speed Ne with a threshold value N1 at step S110. The threshold value N1 is set to be greater than an upper limit of a revolving speed range, in which the system connecting with the crankshaft 156 and the carrier shaft 127 linked with each other via the damper 157 causes the resonance. The control CPU 190 receives data of the revolving speed Ne of the engine 150, which is measured with the speed sensor 176 attached to the distributor 160, from the EFIECU 170 through communication. The revolving speed Ne of the engine 150 may otherwise be calculated from the revolving speed Ns of the sun gear shaft 125 measured with the resolver 139 and the revolving speed Nr of the ring gear shaft 126 measured with the revolver 149 according to the preset gear ratio.

When the revolving speed Ne of the engine 150 is less than the threshold value N1, the processing of steps S108 and S110 is repeatedly executed. When the revolving speed Ne becomes equal to or greater than the threshold value N1, the control CPU 190 leads the open and close timing of the intake valve 152 to a timing in the state of idling rotation at step S112. The control CPU 190 again receives data of the revolving speed Ne of the engine 150 at step S114 and compares the input revolving speed Ne with a threshold value N2 at step S116. The processing of steps S114 and S116 is repeatedly executed until the revolving speed Ne becomes equal to or greater than the threshold value N2. The threshold value N2 is set to be equal to or a little less than the idle revolving speed of the engine 150. When the revolving speed Ne of the engine 150 is equal to or greater than the threshold value N2, the program starts the control of a fuel supply to the engine 150 and ignition with the ignition plug 162 at step S118 and exits from this routine. In accordance with a concrete procedure, the control CPU 190 transmits a control signal to the EFIECU 170, and the EFIECU 170 carries out the actual control of a fuel supply and ignition.

As discussed above, the power output apparatus 110 of the embodiment lags the open and close timing of the intake valve 152 at the time of starting the engine 150, thereby lowering the effective compression ratio of the engine 150 and enabling the first motor MG1 to readily motor or crank the engine 150. This allows the revolving speed Ne of the engine 150 to swiftly pass through the range that causes the resonance of the torsional vibrations on the engine 150 and the first motor MG1 as the inertial mass. The decrease in effective compression ratio of the engine 150 and the resulting reduction of the amplitude of the compression torque of the engine 150 leads to a reduction of the amplitude of the torsional vibrations on the engine 150 and the first motor MG1 as the inertial mass. This effectively prevents the vibrations of the vehicle body and reverberation due to the resonance of the torsional vibrations as well as the damages of the crankshaft 156. This also enables the simplified structure of the damper 157 for reducing the amplitude of the torsional vibrations.

In the starting process routine in the ceasing state of the embodiment, the program enables the first motor MG1 to motor the engine 150 after lagging the open and close timing of the intake valve 152 to a predetermined timing. When the revolving speed Ne of the engine 150 becomes equal to or greater than the threshold value N1, which has been set as a value exceeding the revolving speed range that causes the resonance of the torsional vibrations, the program leads the open and close timing of the intake valve 152 to the timing in the idling state. When the revolving speed Ne of the engine 150 becomes equal to or greater than the threshold value N2, which has been set to be close to the idle revolving speed, the program starts the control of a fuel supply to the engine 150 and ignition. In accordance with another possible procedure, the program enables the first motor MG1 to motor the engine 150 after lagging the open and close timing of the intake valve 152 to a predetermined timing. When the revolving speed Ne of the engine 150 becomes equal to or greater than the threshold value N2, which has been set to be close to the idle revolving speed, the program leads the open and close timing of the intake valve 152 to the timing in the idling state and starts the control of a fuel supply to the engine 150 and ignition.

Figure 11:
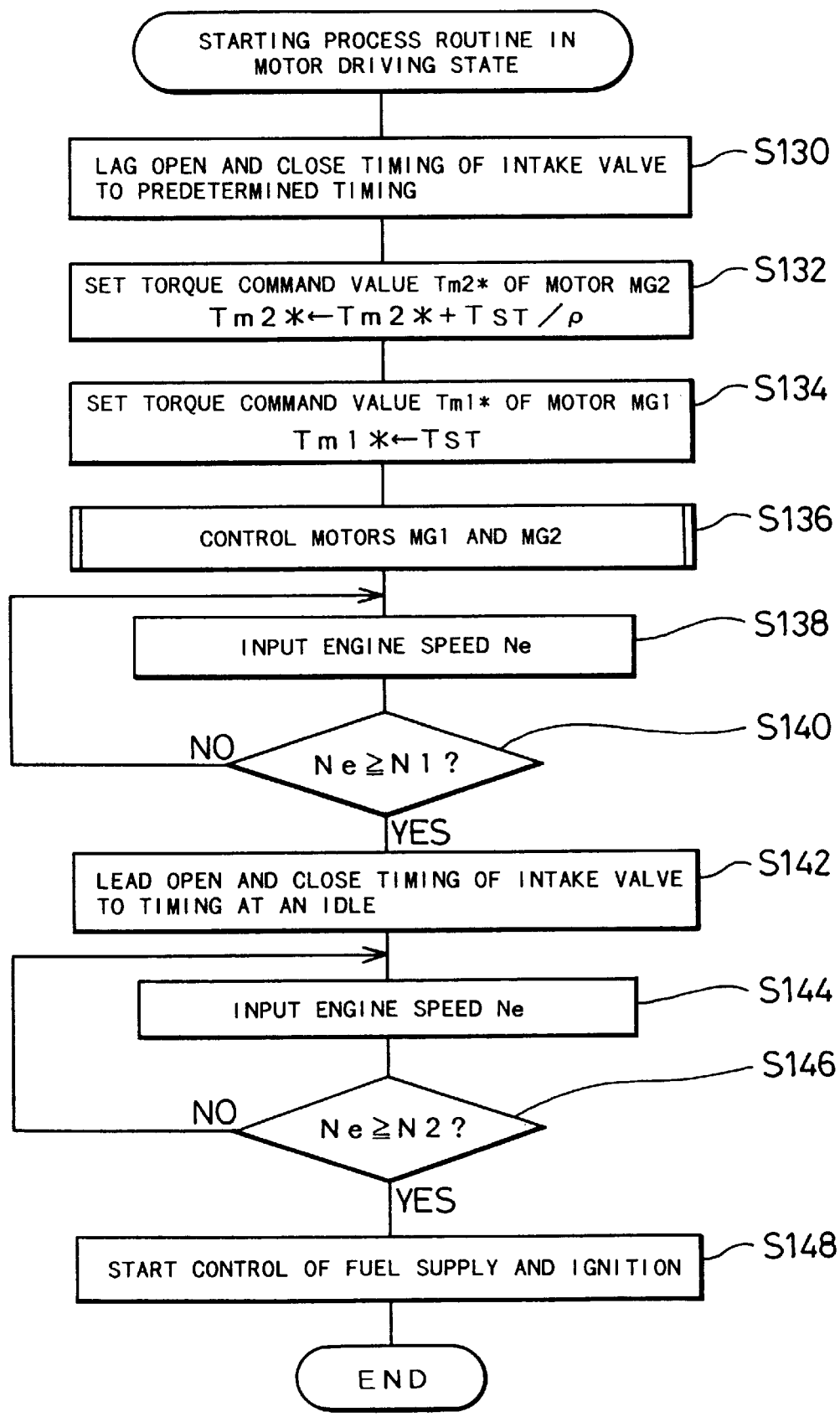
FIG. 11 is a flowchart showing a starting process routine in a motor driving state executed by the control CPU 190 of the controller 180.

The power output apparatus 110 of the embodiment can start the engine 150 while the vehicle is at a stop according to the above procedure. The power output apparatus 110 can also start the engine 150 while the vehicle is driven only by the power output from the second motor MG2 to the ring gear shaft 126. The following describes a starting operation of the engine 150 under such a condition, which follows a starting process routine in a motor driving state shown in the flowchart of FIG. 11. The routine of FIG. 11 is executed in response to an instruction of the driver or in response to a starting signal of the engine 150 while the vehicle is driven only by the power output from the second motor MG2. The starting signal of the engine 150 is given to the control CPU 190 of the controller 180, based on the current state of the power output apparatus 110, for example, a detection signal from the remaining charge meter 199 for measuring the remaining charge BRM of the battery 194.

When the program enters the routine of FIG. 11, the control CPU 190 of the controller 180 first lags the open and close timing of the intake valve 152 to a predetermined timing at step S130, and sets the sum of a torque Tr* (torque command value) to be output to the ring gear shaft 126 and a quotient obtained by dividing a predetermined torque TST by the gear ratio ρ to a torque command value Tm2* of the second motor MG2 at step S132. The control CPU 190 then sets the predetermined torque TST to the torque command value Tm1* of the first motor MG1 at step S134, and carries out the control of the first motor MG1 and the second motor MG2 at step S136. The program subsequently carries out the processing of steps S138 through S148, which is identical with the processing of steps S108 through S118 in the starting process routine in the ceasing state shown in the flowchart of FIG. 7, and exits from this routine.

Figure 12:
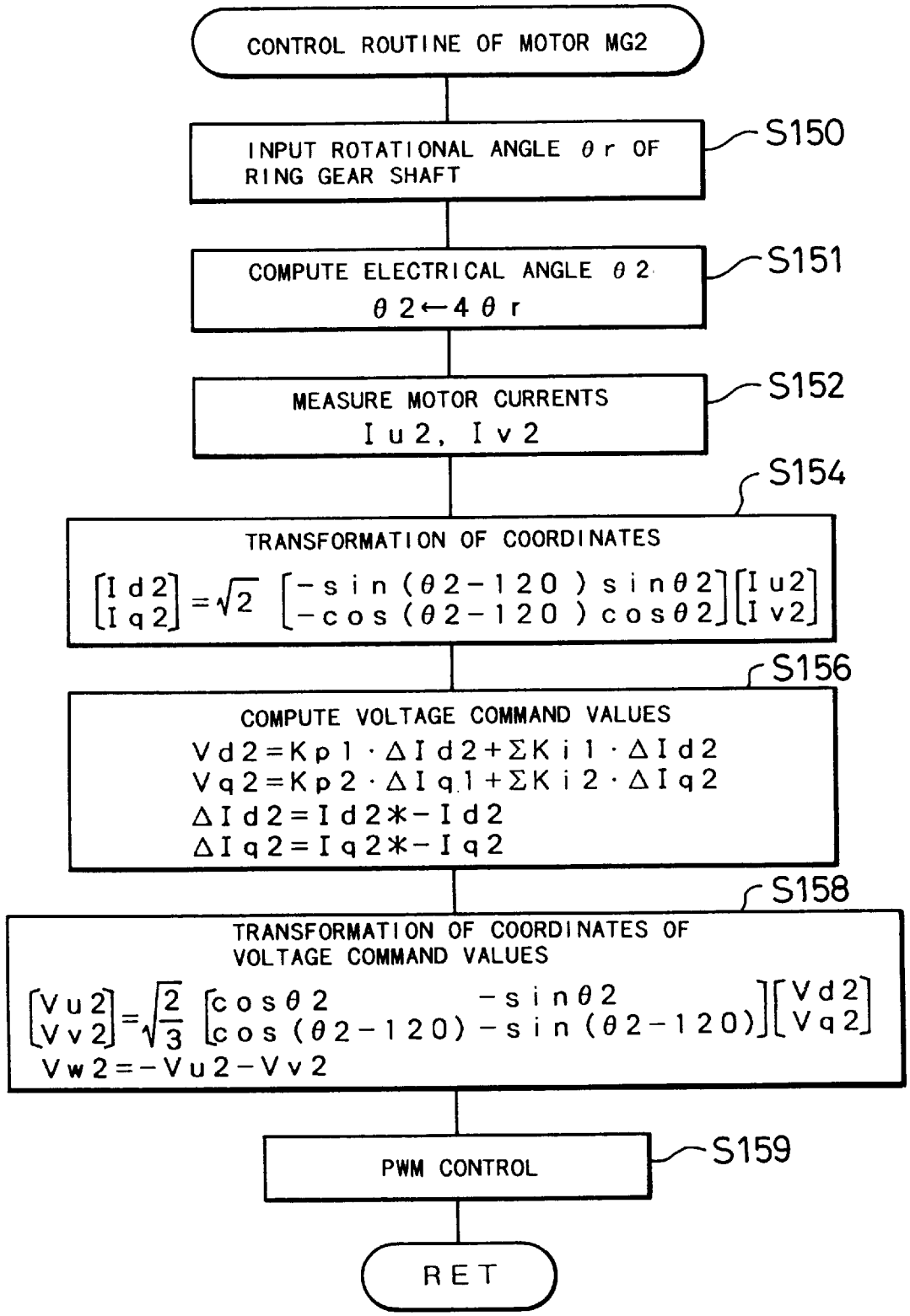
FIG. 12 is a flowchart showing a control routine of the second motor MG2 executed by the control CPU 190 of the controller 180.

The torque command value Tr* is set by another routine (not shown), based on the step-on amount of the accelerator pedal 164 operated by the driver and the revolving speed Nr of the ring gear shaft 126. The torque command value Tr* represents a target torque to be output to the ring gear shaft 126 and eventually to the driving wheels 116 and 118. The process of setting the sum of the torque command value Tr* and the quotient obtained by dividing the predetermined torque TST by the gear ratio ρ to the torque command value Tm2* of the second motor MG2 effectively prevents the torque to be output to the ring gear shaft 126 from being varied by the torque occurring on the ring gear shaft 126 as a reaction force while the first motor MG1 motors the engine 150. The actual control operation of the second motor MG2 executed at step S136 follows a control routine of the second motor MG2 shown in the flowchart of FIG. 12. The control routine of the second motor MG2 shown in FIG. 12 is similar to the control routine of the first motor MG1 shown in the flowchart of FIG. 8 and is not specifically described here.

Figure 13:
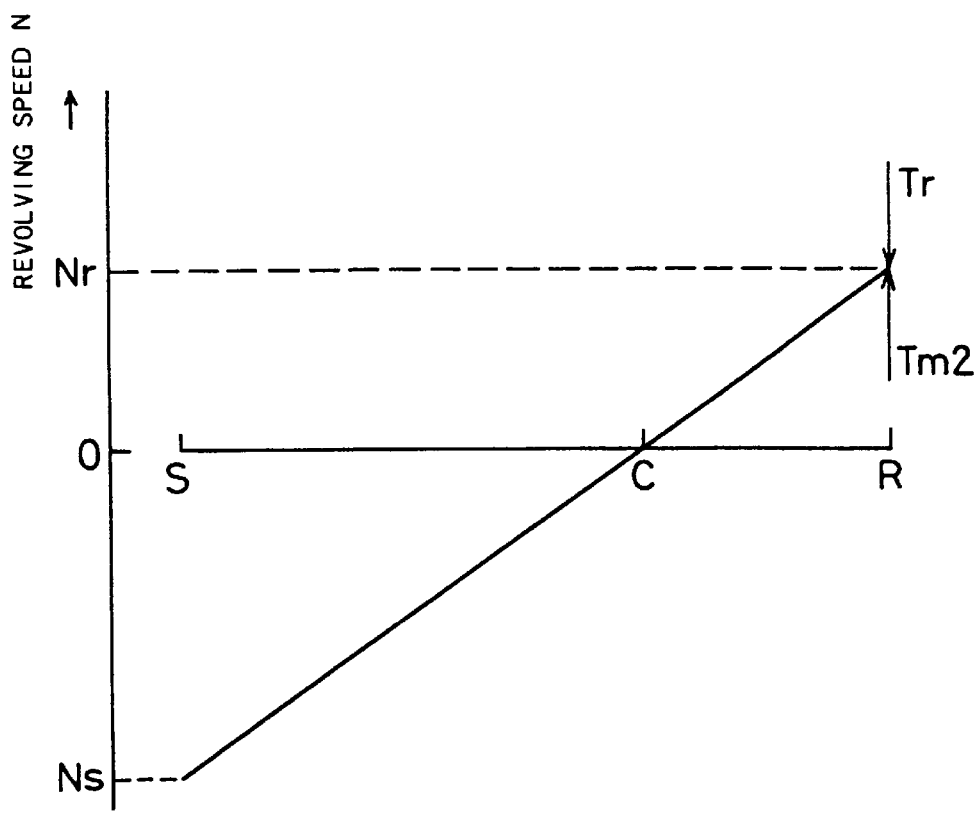
FIG. 13 is a nomogram wherein the engine 150 is at a stop under the condition that the vehicle is driven only by the power output from the second motor MG2.
Figure 14:
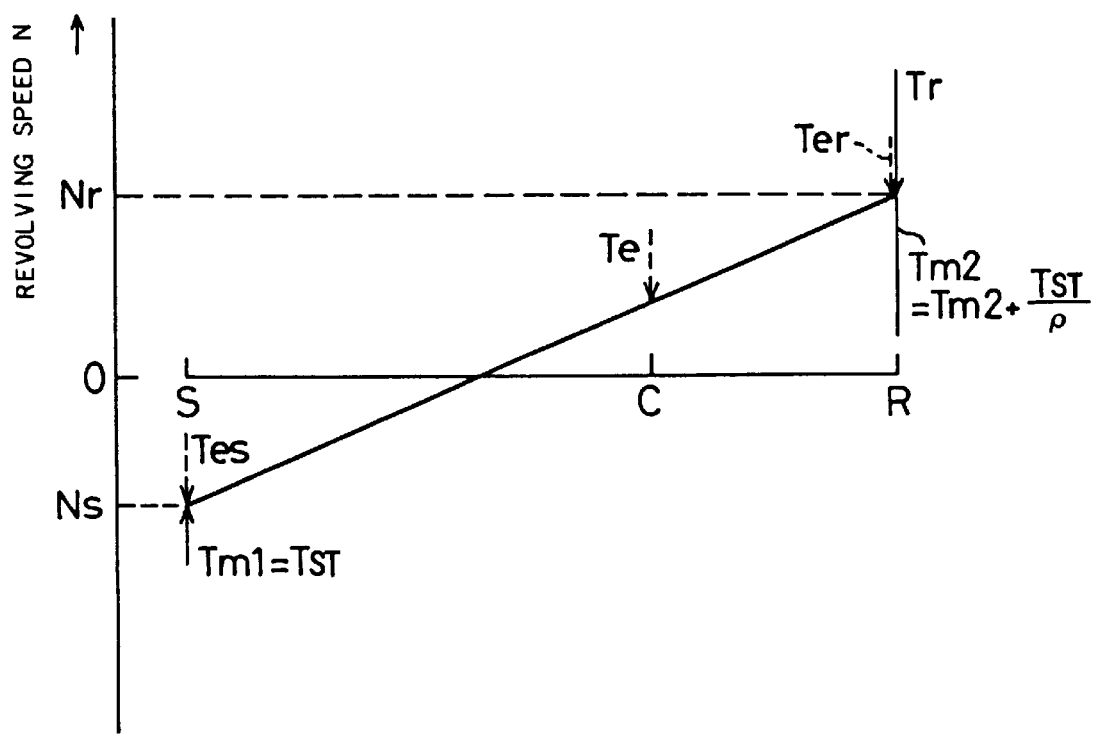
FIG. 14 is a nomogram wherein the engine 150 is kept in the motoring state by means of the first motor MG1 under the condition that the vehicle is driven only by the power output from the second motor MG2.

A variation in nomogram in the course of motoring the engine 150 by means of the first motor MG1 is shown in FIGS. 13 and 14. FIG. 13 is a nomogram wherein the engine 150 is at a stop under the condition that the vehicle is driven only by the power output from the second motor MG2. FIG. 14 is a nomogram wherein the engine 150 is kept in the motoring state by means of the first motor MG1 under the same condition. In the nomogram of FIG. 13, the second motor MG2 outputs the torque Tm2 to the ring gear shaft 126, thereby driving the vehicle, while the engine 150 is at a stop. In this state, the sun gear shaft 125 is revolved to rotate the rotor 132 of the first motor MG1. The first motor MG1 does not, however, carry out either the regenerative operation or the power operation since the torque Tm1 of the first motor MG1 is equal to zero.

When the processing of steps S130 through S136 in the starting process routine in the motor driving state shown in the flowchart of FIG. 11 is carried out in this state, the first motor MG1 outputs the torque TST to the sun gear shaft 125 and the second motor MG2 outputs the total torque of Tm2 and TST/ρ to the ring gear shaft 126. Application of the torque to the sun gear shaft 125 destroys the balance shown in FIG. 13, and the crankshaft 156 of the engine 150 accordingly starts rotating. The revolving speed of the crankshaft 156 increases until the torque Tm1 output from the first motor MG1 to the sun gear shaft 125 balances the contribution (torque Tes) to the sun gear shaft 125 among the whole drag force (torque Te) including the sliding friction of the piston 155 of the engine 150 and the compression work of the engine 150. The contribution (torque Ter) to the ring gear shaft 126 among the whole drag force (torque Te) against the rotation of the engine 150 balances the increase (TST/ρ) in torque Tm2 of the second motor MG2, so that there is no variation in torque output to the ring gear shaft 126.

As discussed above, in case that the engine 150 is started while the vehicle is driven only by the power output from the second motor MG2, the power output apparatus 110 of the embodiment lags the open and close timing of the intake valve 152 at the time of starting the engine 150, thereby enabling the first motor MG1 to readily motor the engine 150. This allows the revolving speed Ne of the engine 150 to swiftly pass through the range that causes the resonance of the torsional vibrations on the engine 150 and the first motor MG1 as the inertial mass. The reduction of the amplitude of the compression torque of the engine 150 leads to a reduction of the amplitude of the torsional vibrations on the engine 150 and the first motor MG1 as the inertial mass. This effectively prevents the vibrations of the vehicle body and reverberation due to the resonance of the torsional vibrations as well as the damages of the crankshaft 156. The torque command value Tm2* of the second motor MG2 is increased by the torque applied to the ring gear shaft 126 in the process of motoring the engine 150 by means of the first motor MG1. The torque output to the ring gear shaft 126 is accordingly kept constant irrespective of motoring of the engine 150 by the first motor MG1. This effectively ensures a good ride on the vehicle.

The power output apparatus 110 of the embodiment lags the open and close timing of the intake valve 152 of the engine 150 to the idle revolving speed prior to motoring the engine 150, since the resonance of the torsional vibrations on the engine 150 and the first motor MG1 as the inertial mass occurs at a revolving speed lower than the idle revolving speed. In case that the revolving speed range that causes the resonance includes the idle revolving speed or exceeds the idle revolving speed, an alternative procedure lags the open and close timing of the intake valve 152 of the engine 150 and enables the first motor MG1 to continue motoring the engine 150 until the revolving speed Ne of the engine 150 becomes greater than the idle revolving speed.

The power output apparatus 110 of the embodiment lags the open and close timing of the intake valve 152 of the engine 150, in order to smoothly motor the engine 150 and reduce the resonance of the torsional vibrations on the engine 150 and the first motor MG1 as the inertial mass. This procedure is applicable not only to the motoring in the process of starting the engine 150 but to the motoring in the process of stopping the engine 150. In the latter case, for example, an engine stop processing routine shown in the flowchart of FIG. 15 is carried out as discussed below.

Figure 15:
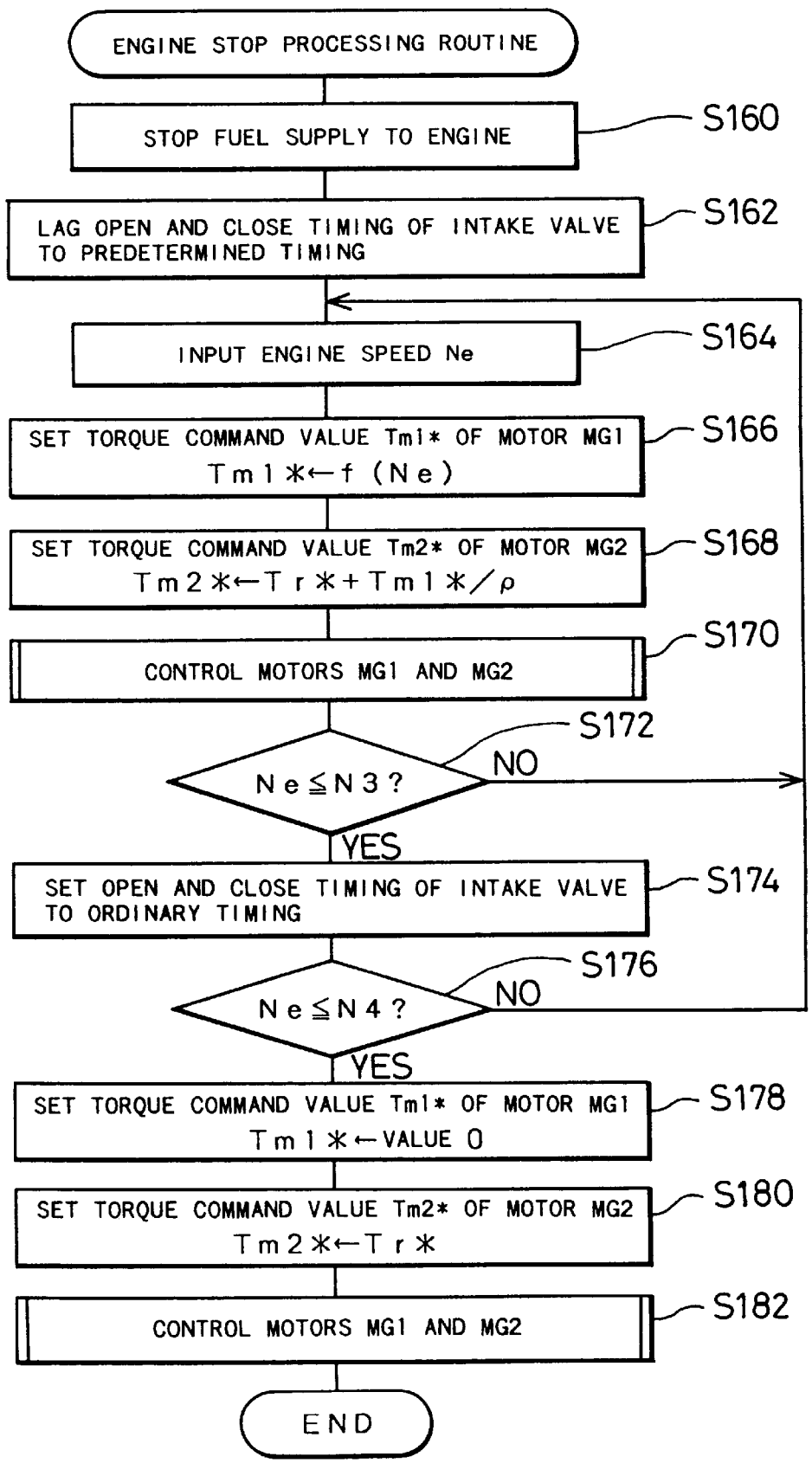
FIG. 15 is a flowchart showing an engine stop processing routine executed by the control CPU 190 of the controller 180.

When the program enters the engine stop processing routine of FIG. 15, the control CPU 190 of the controller 180 first stops a fuel supply to the engine 150 at step S160, and lags the open and close timing of the intake valve 152 to a predetermined timing at step S162. The control CPU 190 then reads the revolving speed Ne of the engine 150 at step S164, and sets the torque command value Tm1* of the first motor MG1 based on the input revolving speed Ne at step S166. The torque command value Tm1* is set based on the revolving speed Ne of the engine 150 after the supply of fuel is stopped. This effectively prevents an abrupt torque change at the time of stopping the fuel supply to the engine 150 from being output as a torque shock to the ring gear shaft 126. In this embodiment, in order to ensure a gentle decrease in revolving speed Ne of the engine 150, the relationship between the revolving speed Ne and the torque Tm1 of the first motor MG1 is obtained experimentally and stored in advance as a map in the ROM 190b. At step S166, the torque command value Tm1* of the first motor MG1 corresponding to the input revolving speed Ne of the engine 150 is read from the map stored in the ROM 190b. This procedure of setting the torque command value Tm1* of the first motor MG1 enables the first motor MG1 to motor the engine 150.

At subsequent step S168, the sum of the torque (torque command value) Tr* to be output to the ring gear shaft 126 and the quotient obtained by dividing the torque command value Tm1* by the gear ratio ρ is set to the torque command value Tm2* of the second motor MG2. The control CPU 190 controls the first motor MG1 and the second motor MG2 using the preset torque command values Tm1* and Tm2* at step S170, and compares the revolving speed Ne with a threshold value N3 at step S172. The actual control operation of the first motor MG1 follows the control routine of the first motor MG1 shown in the flowchart of FIG. 8, and the actual control operation of the second motor MG2 follows the control routine of the second motor shown in the flowchart of FIG. 12. The threshold value N3 is set to be not greater than a lower limit of the revolving speed range that causes the resonance and depends upon the characteristics of the inertial mass consisting of the engine 150 and the first motor MG1. The threshold value N3 may be any value of not greater than the lower limit of the revolving speed range that causes the resonance and is, for example, equal to zero.

In case that the revolving speed Ne of the engine 150 is greater than the threshold value N3, the program determines that the revolving speed is within the range that causes the resonance and repeats the processing of steps S164 through S172, that is, the torque control under the condition that the open and close timing of the intake valve 152 has been lagged to a predetermined timing. Even when the revolving speed Ne of the engine 150 exists in the range that causes the resonance of the torsional vibrations on the engine 150 and the first motor MG1 as the inertial mass, such control procedure reduces the amplitude of the compression torque of the engine 150 and thereby the amplitude of the torsional vibrations of the inertial mass.

In case that the revolving speed Ne of the engine 150 is not greater than the threshold value N3, on the other hand, the program determines that the revolving speed has already passed through the range that causes the resonance, returns the open and close timing of the intake valve 152 to an ordinary level at step S174, and compares the revolving speed Ne of the engine 150 with a threshold value N4 at step S176. The threshold value N4 is set as the revolving speed of the engine 150 that gives a small torque change occurring when the torque Tm1 of the first motor MG1 is set equal to one to naturally stop the engine 150 and causes a torque shock within an allowable range to the ring gear shaft 126. The threshold value N4 depends upon the characteristics of the engine 150 and the first motor MG1.

In case that the revolving speed Ne of the engine 150 is greater than the threshold value N4, the program determines that the torque shock to the ring gear shaft 126 still occurs and repeats the processing of steps S164 through S176, that is, the torque control under the condition that the open and close timing of the intake valve 152 has been returned to the ordinary level. In case that the revolving speed Ne of the engine 150 is not greater than the threshold value N4, on the other hand, the program sets the torque command value Tm1* of the first motor MG1 equal to zero at step S178, sets the torque command value Tr* to be output to the ring gear shaft 126 to the torque command value Tm2* of the second motor MG2 at step S180, and controls the first motor MG1 and the second motor MG2 at step S182, before exiting from this routine. Such control procedure prevents the torque shock to the ring gear shaft 126.

As discussed above, in case that the revolving speed Ne of the engine 150 exists in the range that causes the resonance of the torsional vibrations on the engine 150 and the first motor MG1 as the inertial mass, the power output apparatus 110 of the embodiment lags the open and close timing of the intake valve 152 at the time of starting the engine 150 in the stop processing routine of the engine 150. The procedure reduces the amplitude of the compression torque of the engine 150 and thereby the amplitude of the torsional vibrations of the inertial mass. This effectively prevents the vibrations of the vehicle body and reverberation due to the resonance of the torsional vibrations as well as the damages of the crankshaft 156. The first motor MG1 continues motoring the engine 150 until the revolving speed Ne of the engine 150 becomes equal to or less than the threshold value N4. This structure prevents the torque shock occurring on the ring gear shaft 126.

The above stop processing routine of the engine 150 returns the open and close timing of the intake valve 152 to the ordinary level when the revolving speed Ne of the engine 150 becomes equal to or less than the threshold value N3. An alternative procedure may keep the open and close timing of the intake valve 152 at the predetermined lagged level until the revolution of the engine 150 stops. In this case, the processing of steps S174 and S176 is omitted from the engine stop processing routine of FIG. 15.

The engine stop processing routine of FIG. 15 stops the operation of the engine 150 while the driver steps on the accelerator pedal 164 in order to output the torque to the ring gear shaft 126. An alternative procedure may stop the operation of the engine 150 while the vehicle is at a stop. In this case, since the accelerator pedal 164 is not stepped on, the value '0' is substituted into the torque command value Tr* at steps S168 and S180 for setting the torque command value Tm2* of he second motor MG2.

The following describes another power output apparatus 110B as a second embodiment according to the present invention. The power output apparatus 110B of the second embodiment has the same structure as that of the power output apparatus 110 of the first embodiment. In the power output apparatus 110B of the second embodiment, the same constituents as those of the power output apparatus 110 of the first embodiment are expressed by like numerals and symbols and not specifically described here. The symbols used in the first embodiment have the same meanings in the second embodiment unless otherwise specified.

Figure 16:
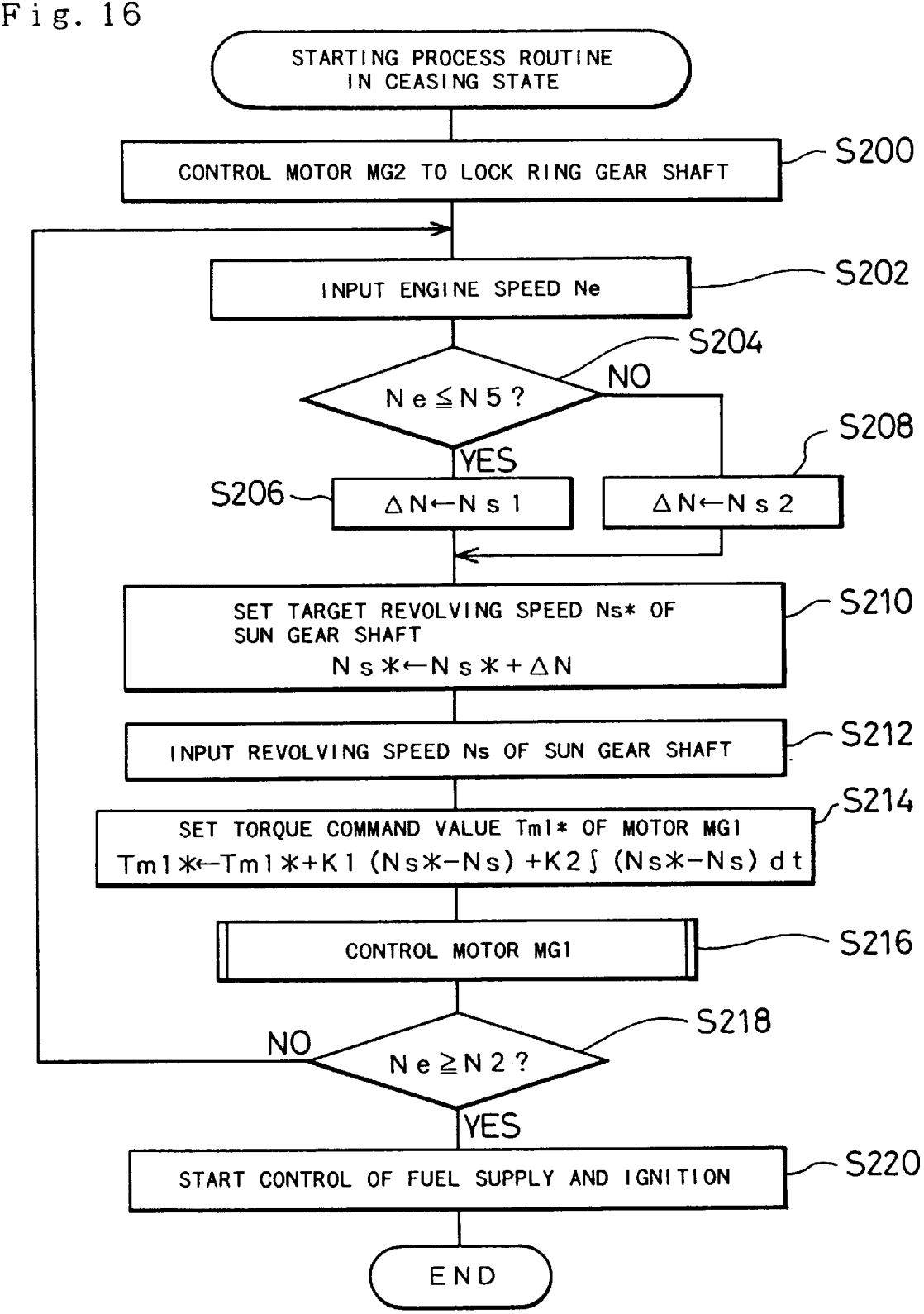
FIG. 16 is a flowchart showing a starting process routine in a ceasing state executed by the controller 180 in a second embodiment according to the present invention.

The power output apparatus 110B of the second embodiment carries out a starting operation of the engine 150, which follows a starting process routine in a ceasing state shown in the flowchart of FIG. 16. Like the first embodiment, the starting process routine in the ceasing state is executed in response to an ON operation of the starter switch 179 while the vehicle is at a stop. When the program enters the routine of FIG. 16, the control CPU 190 of the controller 180 first controls the second motor MG2 to lock the ring gear shaft 126 at step S200, reads the revolving speed Ne of the engine 150 at step S202, and compares the input revolving speed Ne with a threshold value N5 at step S204. The threshold value N5 is set to be not less than the upper limit of the revolving speed range that causes the resonance of the inertial mass constituting the engine 150 and the first motor MG1, and depends upon the characteristics of the engine 150 and the first motor MG1.

In case that the revolving speed Ne of the engine 150 is not greater than the threshold value N5, a predetermined value Ns1 is set to an amount of change ΔN at step S206. In case that the revolving speed Ne of the engine 150 is greater than the threshold value N5, on the other hand, a predetermined value Ns2 is set to the amount of change ΔN at step S208. The control CPU 190 subsequently adds the preset amount of change ΔN to a target revolving speed Ns* of the sun gear shaft 125 to determine a new target revolving speed Ns* at step S210. The predetermined values Ns1 and Ns2 are set as amounts of increase in target revolving speed Ns* of the sun gear shaft 125. In this embodiment, the predetermined value Ns1 is set to be greater than the predetermined value Ns2. The greater amount of change in target revolving speed Ns* of the sun gear shaft 125 is accordingly set in case that the revolving speed Ne of the engine 150 is not greater than the threshold value N5, compared with the case in which the revolving speed Ne is greater than the threshold value N5.

After setting the target revolving speed Ns* of the sun gear shaft 125, the control CPU 190 reads the actual revolving speed Ns of the sun gear shaft 125 at step S212, sets the torque command value Tm1* of the first motor MG1 based on the preset target revolving speed Ns* and the input revolving speed Ns according to Equation (9) given below at step S214, and controls the first motor MG1 at step S216. The second term on the right side of Equation (9) is a proportional term to cancel the deviation of the actual revolving speed Ns from the target revolving speed Ns*. The third term on the right side is an integral term to cancel the stationary deviation. This procedure of setting the torque command value Tm1* and controlling the first motor MG1 enables the sun gear shaft 125 to rotate at the target revolving speed Ns*.

$$Tm1^* \leftarrow Tm1^* + K1(Ns^* - Ns) + K2\int (Ns^* - Ns)dt \qquad (9)$$

The control CPU 190 then compares the revolving speed Ne of the engine 150 with the threshold value N2 at step S218 and repeats the processing of steps S202 through S218 until the revolving speed Ne becomes equal to or greater than the threshold value N2. When the revolving speed Ne becomes equal to or greater than the threshold value N2, the fuel supply control and the ignition control are initiated to start the engine 150 at step S220.

Figure 17:
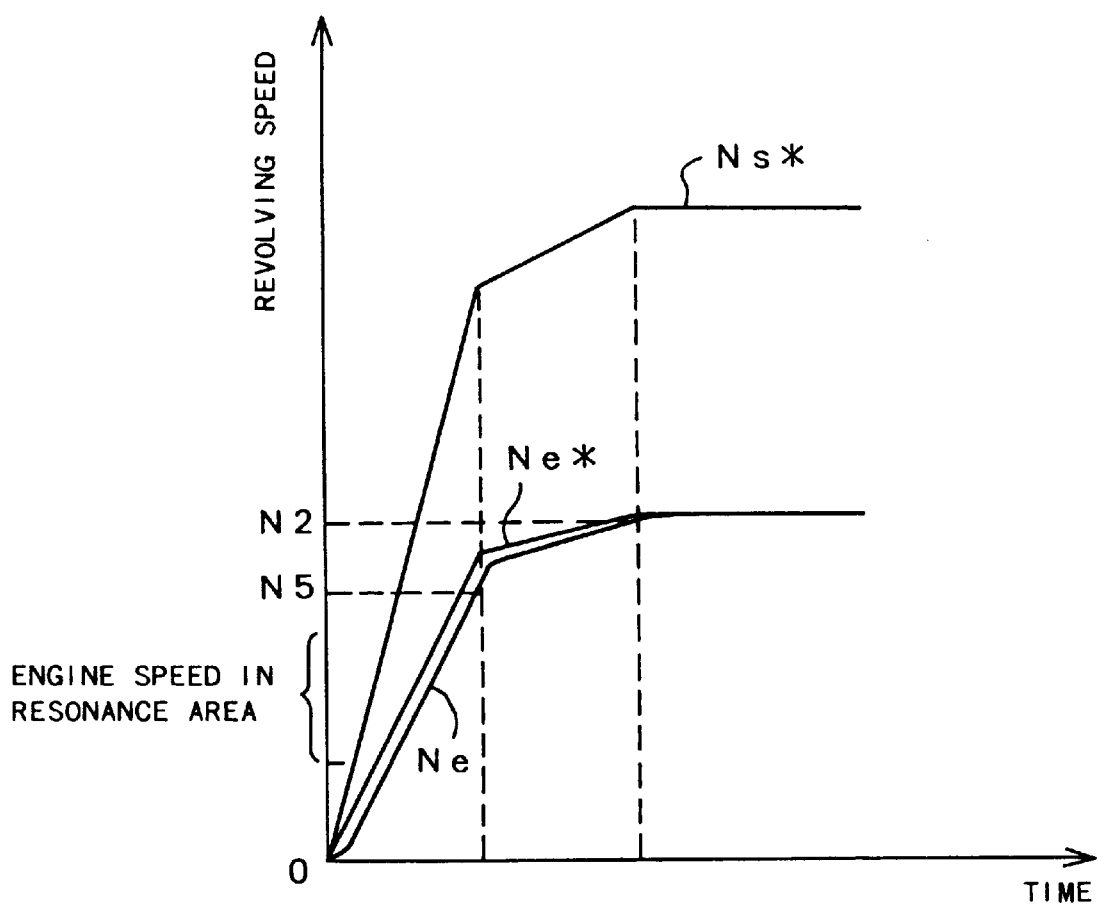
FIG. 17 shows variations in target revolving speed Ns* of the sun gear shaft 125 and revolving speed Ne of the engine 150 when the starting process routine in the ceasing state shown in FIG. 16 is carried out.

FIG. 17 shows variations in target revolving speed Ns* of the sun gear shaft 125 and revolving speed Ne of the engine 150 when the starting process routine in the ceasing state shown in FIG. 16 is carried out. Referring to FIG. 17, the target revolving speed Ns* of the sun gear shaft 125 increases by the amount of change ΔN equal to the predetermined value Ns1 that is greater than the predetermined value Ns2 until the revolving speed Ne of the engine 150 becomes greater than the threshold value N5. The target revolving speed Ns* then increases by the amount of change ΔN equal to the predetermined value Ns2. Since the vehicle is at a stop, the nomogram in this state is equivalent to that of FIG. 10. A linear relationship is accordingly held between the variation in target revolving speed Ns* of the sun gear shaft 125 and the variation in target revolving speed Ne* of the engine 150. More concretely, the relationship of Ns*:1+ρ=Ne*:ρ is held between the target revolving speed Ns* and the target revolving speed Ne*.

The target revolving speed Ne* of the engine 150 varies with a variation in target revolving speed Ns* of the sun gear shaft 125, while the first motor MG1 is driven and regulated. The feedback control of the first motor MG1 enables the revolving speed Ne of the engine 150 to vary in a range a little lower than the target revolving speed Ne* as shown in FIG. 17. In this embodiment, the target revolving speed Ne* increases by a greater amount of change until the revolving speed Ne of the engine 150 exceeds the threshold value N5 set to be not less than the upper limit of the range that causes the resonance. The revolving speed Ne of the engine 150 thus abruptly increases and swiftly passes through the range that causes the resonance. A continuous increase in target revolving speed Ne* by the greater amount of change causes the revolving speed Ne of the engine 150 to overshoot after the threshold value N2. In the structure of the embodiment, however, the amount of change ΔN of the target revolving speed Ns* is set equal to the predetermined value Ns2 that is smaller than the predetermined value Ns1, after the revolving speed Ne exceeds the threshold value N5. This lessens the amount of change of the target revolving speed Ne*, thereby preventing the revolving speed Ne of the engine 150 from overshooting but being kept at the idle revolving speed.

As discussed above, the power output apparatus 110B of the second embodiment increases the target revolving speed Ne* of the engine 150 by the greater amount of change, until the revolving speed Ne of the engine 150 exceeds the upper limit of the range that causes the resonance of the torsional vibrations on the engine 150 and the first motor MG1 as the inertial mass. The structure of the second embodiment accordingly enables the first motor MG1 to continue motoring the engine 150 until the revolving speed Ne exceeds the upper limit of the range. This structure allows the revolving speed Ne to swiftly pass through the range that causes the resonance. This effectively prevents the vibrations of the vehicle body and reverberation due to the resonance of the torsional vibrations as well as the damages of the crankshaft 156. This also enables the simplified structure of the damper 157 for reducing the amplitude of the torsional vibrations. After the revolving speed Ne of the engine 150 exceeds the range that causes the resonance, the target revolving speed Ne* of the engine 150 increases by the smaller amount of change. This effectively prevents the revolving speed Ne of the engine 150 from overshooting and becoming significantly greater than the idle revolving speed.

Figure 18:
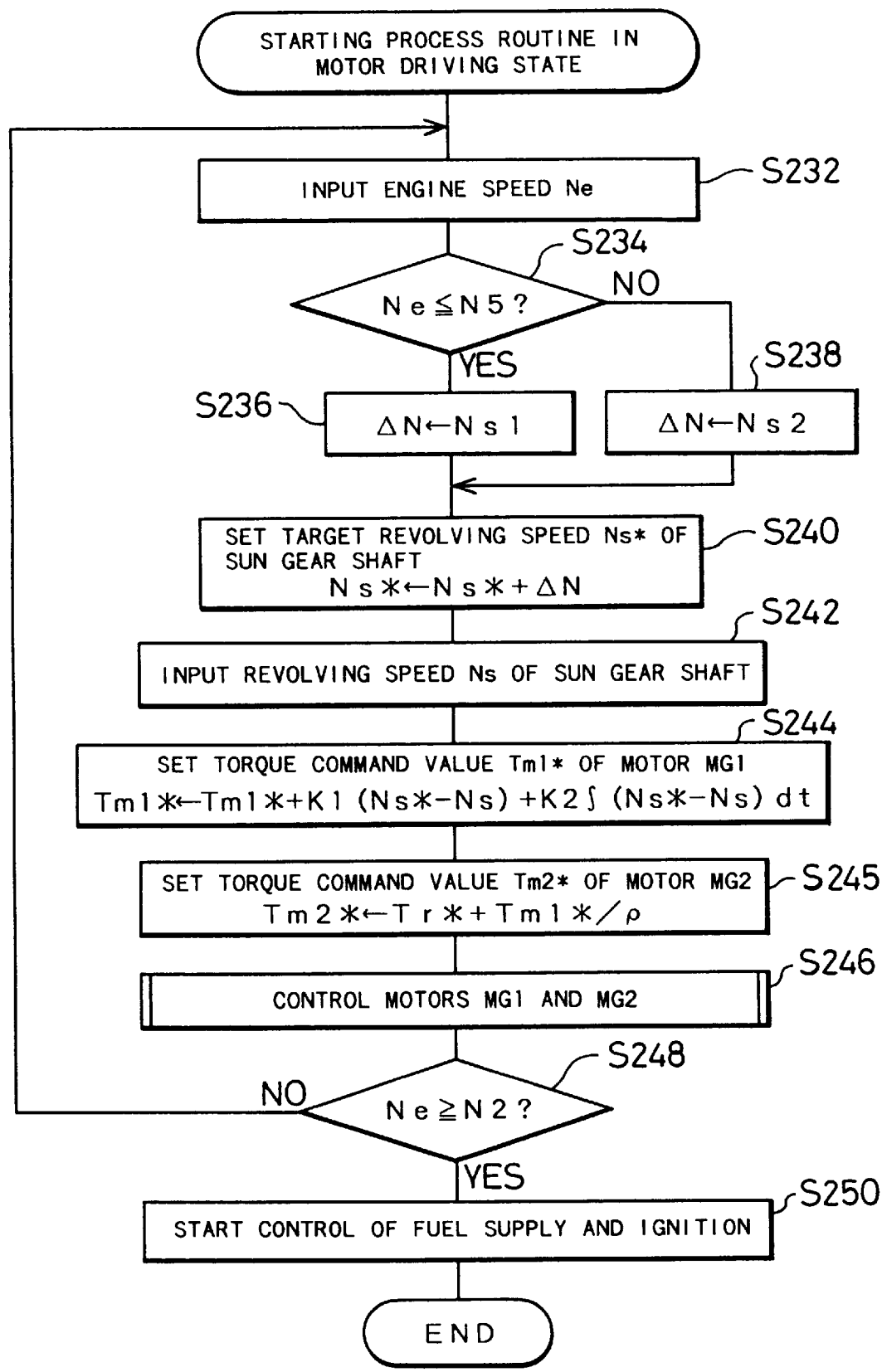
FIG. 18 is a flowchart showing a starting process routine in a motor driving state executed by the controller 180 in the second embodiment.

The power output apparatus 110B of the second embodiment also carries out a starting operation of the engine 150 while the vehicle is driven only by the power output from the second motor MG2 to the ring gear shaft 126, which follows a starting process routine in a motor driving state shown in the flowchart of FIG. 18. Like the first embodiment, the routine of FIG. 18 is executed in response to an instruction of the driver or in response to a starting signal of the engine 150 while the vehicle is driven only by the power output from the second motor MG2. The starting signal of the engine 150 is given to the control CPU 190 of the controller 180, based on the current state of the power output apparatus 110B, for example, a detection signal from the remaining charge meter 199 for measuring the remaining charge BRM of the battery 194.

When the program enters the routine of FIG. 18, the control CPU 190 of the controller 180 first carries out the processing of step S232 through S244, which is identical with the processing of steps S202 through S214 in the starting process routine in the ceasing state shown in the flowchart of FIG. 16. Namely the control CPU 190 reads the revolving speed Ne of the engine 150 at step S232, sets the amount of change ΔN according to the revolving speed Ne at steps S234 through S238, sets the target revolving speed Ns* of the sun gear shaft 125 based on the amount of change ΔN at step S240, reads the revolving speed Ns of the sun gear shaft 125 at step S242, and sets the torque command value Tm1* of the first motor MG1 according to Equation (9) given above at step S244. The control CPU 190 then sets the sum of the torque command value Tr* to be output to the ring gear shaft 126 and the quotient obtained by dividing the preset torque command value Tm1* by the gear ratio ρ to the torque command value Tm2* of the second motor MG2 at step S245, and controls the first motor MG1 and the second motor MG2 at step S246. The process of setting the sum of the torque command value Tr* and the quotient obtained by dividing the preset torque command value Tm1* by the gear ratio ρ to the torque command value Tm2* of the second motor MG2 effectively prevents the torque to be output to the ring gear shaft 126 from being varied by the torque occurring on the ring gear shaft 126 as a reaction force while the first motor MG1 motors the engine 150. The processing of steps S232 through S246 is repeated until the revolving speed Ne of the engine 150 becomes equal to or greater than the threshold value N2 at step S248. When the revolving speed Ne becomes equal to or greater than the threshold value N2, the fuel supply control and the ignition control are initiated to start the engine 150 at step S250.

Figure 19:
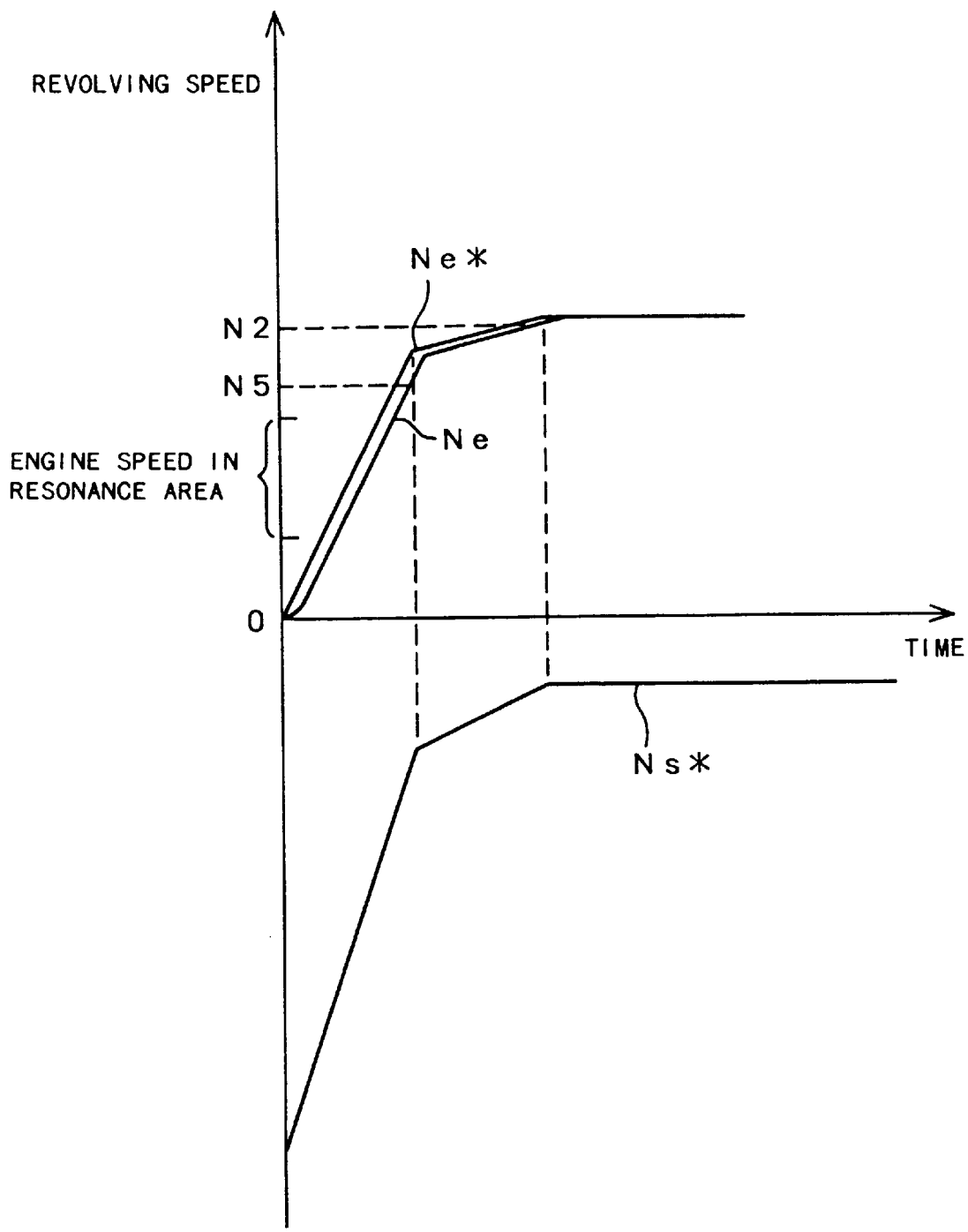
FIG. 19 shows variations in target revolving speed Ns* of the sun gear shaft 125 and revolving speed Ne of the engine 150 when the starting process routine in the motor driving state shown in FIG. 18 is carried out.

FIG. 19 shows variations in target revolving speed Ns* of the sun gear shaft 125 and revolving speed Ne of the engine 150 when the starting process routine in the motor driving state shown in FIG. 18 is carried out. The vehicle is driven only by the power output from the second motor MG2 to the ring gear shaft 126 while the engine 150 is at a stop. The nomogram in this state is equivalent to that of FIG. 13. The target revolving speed Ns* of the sun gear shaft 125 accordingly has a negative value. The starting process routine in the motor driving state shown in the flowchart of FIG. 18 is carried out in this state. The only difference between the state of FIG. 19 and the state of FIG. 17 is accordingly the initial value of the target revolving speed Ns* of the sun gear shaft 125.

As discussed above, in the starting operation while the vehicle is driven only by the power output from the second motor MG2, the power output apparatus 110B of the second embodiment also increases the target revolving speed Ne* of the engine 150 by the greater amount of change, until the revolving speed Ne of the engine 150 exceeds the upper limit of the range that causes the resonance of the torsional vibrations on the engine 150 and the first motor MG1 as the inertial mass. The structure of the second embodiment accordingly enables the first motor MG1 to continue motoring the engine 150 until the revolving speed Ne exceeds the upper limit of the range. This structure allows the revolving speed Ne to swiftly pass through the range that causes the resonance. This effectively prevents the vibrations of the vehicle body and reverberation due to the resonance of the torsional vibrations as well as the damages of the crankshaft 156. This also enables the simplified structure of the damper 157 for reducing the amplitude of the torsional vibrations. After the revolving speed Ne of the engine 150 exceeds the range that causes the resonance, the target revolving speed Ne* of the engine 150 increases by the smaller amount of change. This effectively prevents the revolving speed Ne of the engine 150 from overshooting and becoming significantly greater than the idle revolving speed.

Since the resonance of the torsional vibrations on the engine 150 and the first motor MG1 as the inertial mass occurs at a specific revolving speed lower than the idle revolving speed, the power output apparatus 110B of the second embodiment increases the target revolving speed Ne* of the engine 150 by the greater amount of change until the revolving speed Ne of the engine 150 exceeds this specific revolving speed. This allows the revolving speed Ne of the engine 150 to swiftly pass through the range that causes the resonance. In case that the revolving speed range that causes the resonance includes the idle revolving speed or exceeds the idle revolving speed, an alternative procedure increases the target revolving speed Ne* of the engine 150 by the greater amount of change until the revolving speed Ne of the engine 150 becomes greater than the idle revolving speed.

The power output apparatus 110B of the second embodiment increases the target revolving speed Ne* of the engine 150 by the greater amount of change until the revolving speed Ne of the engine 150 exceeds the upper limit of the range that causes the resonance of the torsional vibrations on the engine 150 and the first motor MG1 as the inertial mass, thereby allowing the revolving speed Ne of the engine 150 to swiftly pass through the range that causes the resonance. This procedure is applicable not only to the motoring in the process of starting the engine 150 but to the motoring in the process of stopping the engine 150. In the latter case, for example, an engine stop processing routine shown in the flowchart of FIG. 20 is carried out as discussed below.

Figure 20:
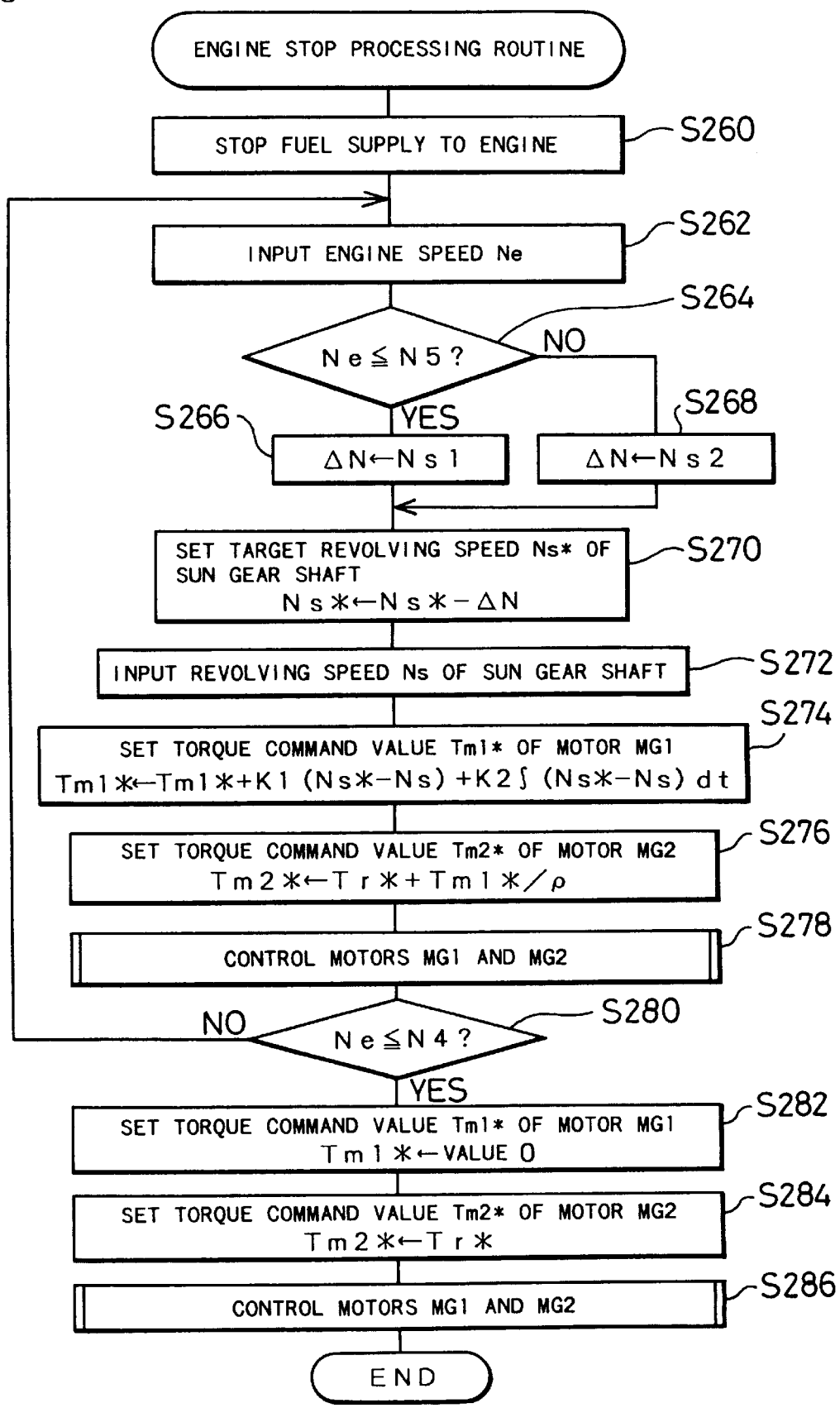
FIG. 20 is a flowchart showing an engine stop processing routine executed by the controller 180 in the second embodiment.

When the program enters the engine stop processing routine of FIG. 20, the control CPU 190 of the controller 180 first stops a fuel supply to the engine 150 at step S260, reads the revolving speed Ne of the engine 150 at step S262, and compares the input revolving speed Ne with a threshold value N6 at step S264. The threshold value N6 is set to be not greater than the lower limit of the revolving speed range that causes the resonance and depends upon the characteristics of the inertial mass consisting of the engine 150 and the first motor MG1. In case that the revolving speed Ne of the engine 150 is not greater than the threshold value N6, the predetermined value Ns1 is set to the amount of change ΔN at step S266. In case that the revolving speed Ne of the engine 150 is greater than the threshold value N6, on the other hand, the predetermined value Ns2 is set to the amount of change ΔN at step S268. The control CPU 190 then subtracts the preset amount of change ΔN from the target revolving speed Ns* of the sun gear shaft 125 to set a new target revolving speed Ns* at step S270. The greater amount of change in target revolving speed Ns* of the sun gear shaft 125 is accordingly set in case that the revolving speed Ne of the engine 150 is not greater than the threshold value N6, compared with the case in which the revolving speed Ne is greater than the threshold value N6.

After setting the target revolving speed Ns* of the sun gear shaft 125, the control CPU 190 reads the actual revolving speed Ns of the sun gear shaft 125 at step S272, sets the torque command value Tm1* of the first motor MG1 according to Equation (9) given above at step S274, sets the sum of the torque command value Tr* to be output to the ring gear shaft 126 and the quotient obtained by dividing the preset torque command value Tm1* by the gear ratio ρ to the torque command value Tm2* of the second motor MG2 at step S276, and controls the first motor MG1 and the second motor MG2 at step S278. The processing of steps S262 through S278 is repeated until no torque shock occurs on the ring gear shaft 126 even when the torque Tm1 of the first motor MG1 is equal to zero, that is, until the revolving speed Ne of the engine 150 becomes equal to or less than the threshold value N4 at step S280. When the revolving speed Ne becomes equal to or less than the threshold value N4, the program sets the torque command value Tm1* of the first motor MG1 equal to zero at step S282, sets the torque command value Tr* to be output to the ring gear shaft 126 to the torque command value Tm2* of the second motor MG2 at step S284, and controls the first motor MG1 and the second motor MG2 at step S286, prior to exiting from this routine.

The procedure of stopping the engine 150 is equivalent to the operation in the state of FIG. 17 with the inverted time axis when the vehicle is at a stop, and is equivalent to the operation in the state of FIG. 19 with the inverted time axis when the vehicle is driven. In case that the processing routine stops the operation of the engine 150 while the vehicle is at a stop, since the accelerator pedal 164 is not stepped on, the value '0' is substituted into the torque command value Tr* at steps S276 and S284 for setting the torque command value Tm2* of he second motor MG2.

As discussed above, in case that the revolving speed Ne of the engine 150 exists in the range that causes the resonance of the torsional vibrations on the engine 150 and the first motor MG1 as the inertial mass, the stop processing routine of the engine 150 increases the target revolving speed Ne* of the engine 150 by the greater amount of change, thereby allowing the revolving speed Ne to swiftly pass through the range that causes the resonance. This effectively prevents the vibrations of the vehicle body and reverberation due to the resonance of the torsional vibrations as well as the damages of the crankshaft 156. This also enables the simplified structure of the damper 157 for reducing the amplitude of the torsional vibrations. The first motor MG1 continues motoring the engine 150 until the revolving speed Ne of the engine 150 becomes equal to or less than the threshold value N4. This effectively prevents a torque shock from occurring on the ring gear shaft 126.

Figure 21:
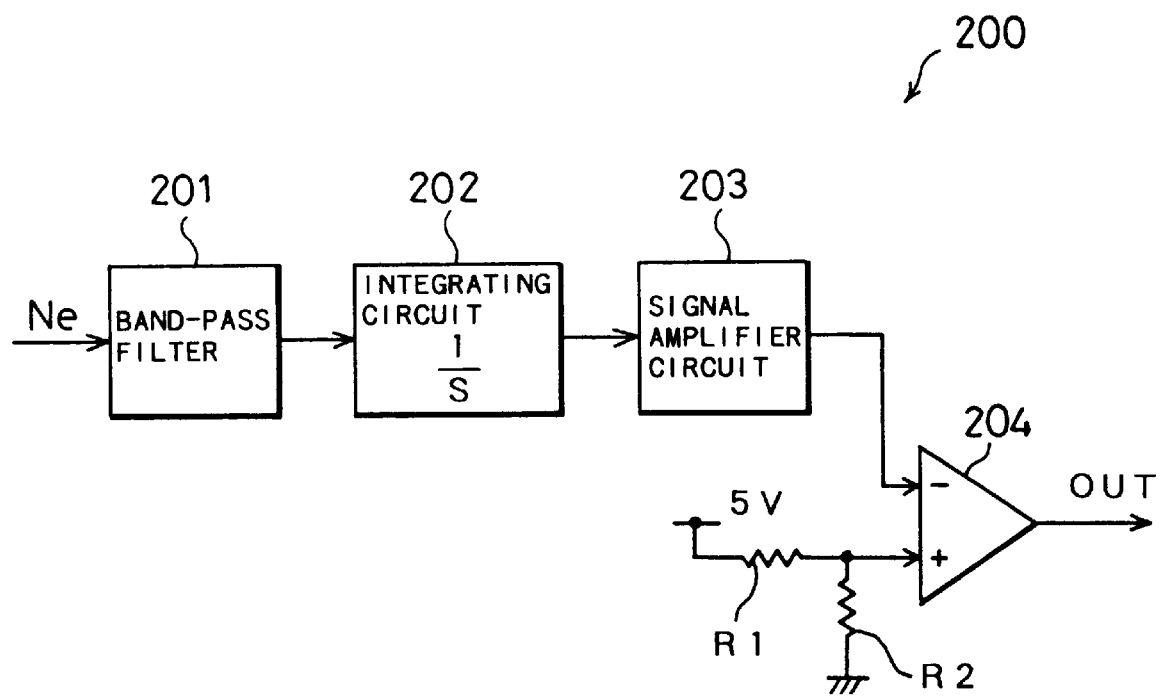
FIG. 21 is a block diagram schematically illustrating structure of a resonance decision circuit 200.

The power output apparatus 110 of the first embodiment and the power output apparatus 110B of the second embodiment includes a resonance decision circuit 200 illustrated in the block diagram of FIG. 21. The resonance decision circuit 200 determines whether or not the inertial mass consisting of the engine 150 and the first motor MG1 has the resonance of the torsional vibrations. As shown in FIG. 21, the resonance decision circuit 200 includes a band-pass filter 201 for receiving the revolving speed Ne of the engine 150 and allowing passage of only the frequency range that causes the resonance among the frequency component of the revolving speed Ne of the engine 150, an integrating circuit 202 for integrating the absolute value of the amplitude of the frequency component output from the band-pass filter 201 over a predetermined time period and outputting a signal corresponding to the resonance energy, a signal amplifier circuit 203 for amplifying the signal corresponding to the resonance energy output from the integrating circuit 202, resistances R1 and R2 for generating a comparative signal of a predetermined voltage level from a 5-volt power source, and a comparator 204 that falls in the low-active state when the level of the energy corresponding to the resonance energy output from the signal amplifier circuit 203 becomes greater than the level of the comparative signal. An input port of the band-pass filter 201, which is the input terminal of the resonance decision circuit 200, is connected to an output port of the control CPU 190 for outputting the revolving speed Ne of the engine 150. An output port of the comparator 204, which is the output terminal of the resonance decision circuit 200, is connected to an input port of the control CPU 190. The control CPU 190 accordingly outputs the revolving speed Ne of the engine 150 to the resonance decision circuit 200, while receiving a specific signal from the resonance decision circuit 200. The specific signal represents the state that the resonance energy of the inertial mass consisting of the engine 150 and the first motor MG1 is equal to or greater than a predetermined level. In response to this specific signal output from the resonance decision circuit 200 to represent that the resonance energy has reached the predetermined level, the control CPU 190 can carry out the control operations to avoid the potential troubles due to the resonance, for example, the control operation to stop the first motor MG1 from motoring the engine 150. This structure securely prevents the vibrations of the vehicle body and reverberation due to the resonance of the torsional vibrations as well as the damages of the crankshaft 156.

Figure 22:
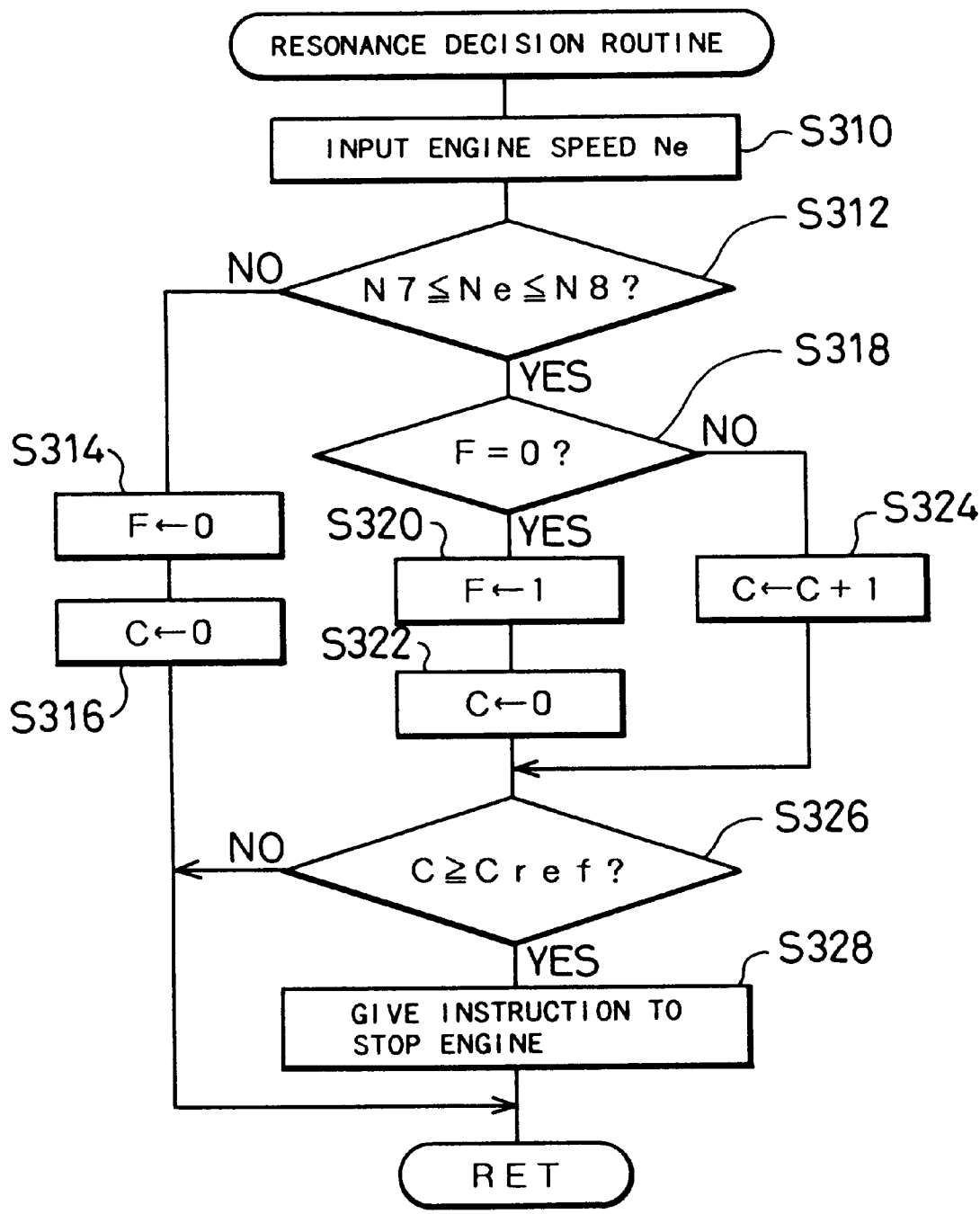
FIG. 22 is a flowchart showing a resonance decision routine executed by the controller 180 in both the first embodiment and the second embodiment.

The control operation, which stops the first motor MG1 from motoring the engine 150 when the resonance of the torsional vibrations occurs, may follow a resonance decision routine shown in the flowchart of FIG. 22. When the program enters the resonance decision routine of FIG. 22, the control CPU 190 of the controller 180 first reads the revolving speed Ne of the engine 150 at step S310, and determines whether or not the input revolving speed Ne is between a threshold value N7 and another threshold value N8 at step S312. The threshold value N7 is set to be not greater than the lower limit of the revolving speed range that causes the resonance of the inertial mass consisting of the engine 150 and the first motor MG1. The threshold value N8 is set to be not less than the upper limit of the revolving speed range that causes the resonance.

When the revolving speed Ne of the engine 150 is not between the threshold value N7 and the threshold value N8, the control CPU 190 sets a resonance decision flag F equal to zero at step S314 and a counter C equal to zero at step S316, prior to exiting from this routine.

When the revolving speed Ne of the engine 150 is between the threshold value N7 and the threshold value N8, on the other hand, it is determined whether or not the resonance decision flag F is equal to zero at step S318. In case that the resonance decision flag F is equal to zero, the control CPU 190 sets the resonance decision flag F equal to one at step S320 and the counter C equal to zero at step S322. In case that the resonance decision flag F is equal to one, on the contrary, the control CPU 190 increments the counter C at step S324. After the processing of either step S322 or step S324, the control CPU 190 compares the counter C with a threshold value Cref at step S326. The threshold value Cref is set as a maximum value of an allowable time period since the time point at which the revolving speed Ne of the engine 150 entered the range that causes the resonance, or otherwise as a value a little less than the maximum value. The threshold value Cref depends upon the frequency of activation of this routine. The amplitude of the torsional vibrations of the inertial mass consisting of the engine 150 and the first motor MG1 increases with the elapse of time since the time point at which the revolving speed Ne of the engine 150 entered the range that causes the resonance. The amplitude of the torsional vibrations reflects the resonance energy, so that the troubles, such as the occurrence of vibrations of the vehicle body and reverberation due to the resonance and damages of the crankshaft 156, become apparent with an increase in amplitude of the torsional vibrations. In this embodiment, the threshold value Cref is set to be shorter than the required time period for the amplitude of the torsional vibrations to exceed an allowable range.

When the counter C is less than the threshold value Cref, the program determines that the amplitude of the torsional vibrations is still small and exits from this routine. When the counter C is not less than the threshold value Cref, on the other hand, the program determines that the amplitude of the torsional vibrations is large to exceed the allowable range and outputs a stop instruction to stop the first motor MG1 from motoring the engine 150 at step S328.

The resonance decision routine discussed above can determine that the amplitude of the torsional vibrations of the inertial mass consisting of the engine 150 and the first motor MG1 exceeds the allowable range. The procedure of stopping the first motor MG1 from motoring the engine 150 based on the determination can effectively prevent the troubles, such as the occurrence of vibrations of the vehicle body and reverberation due to the resonance and damages of the crankshaft 156.

Permanent magnet (PM)-type synchronous motors are used as the first motor MG1 and the second motor MG2 in the above embodiments. Any other motors which can implement both the regenerative operation and the power operation, such as variable reluctance (VR)-type synchronous motors, vernier motors, d.c. motors, induction motors, superconducting motors, and stepping motors, may, however, be used according to the requirements.

Transistor inverters are used as the fist and the second driving circuits 191 and 192 in the above embodiments. Other available examples include IGBT (insulated gate bipolar mode transistor) inverters, thyristor inverters, voltage PWM (pulse width modulation) inverters, square-wave inverters (voltage inverters and current inverters), and resonance inverters.

The battery 194 in the above embodiments may include Pb cells, NiMH cells, Li cells, or the like cells. A capacitor may be used in place of the battery 194.

Figure 23:
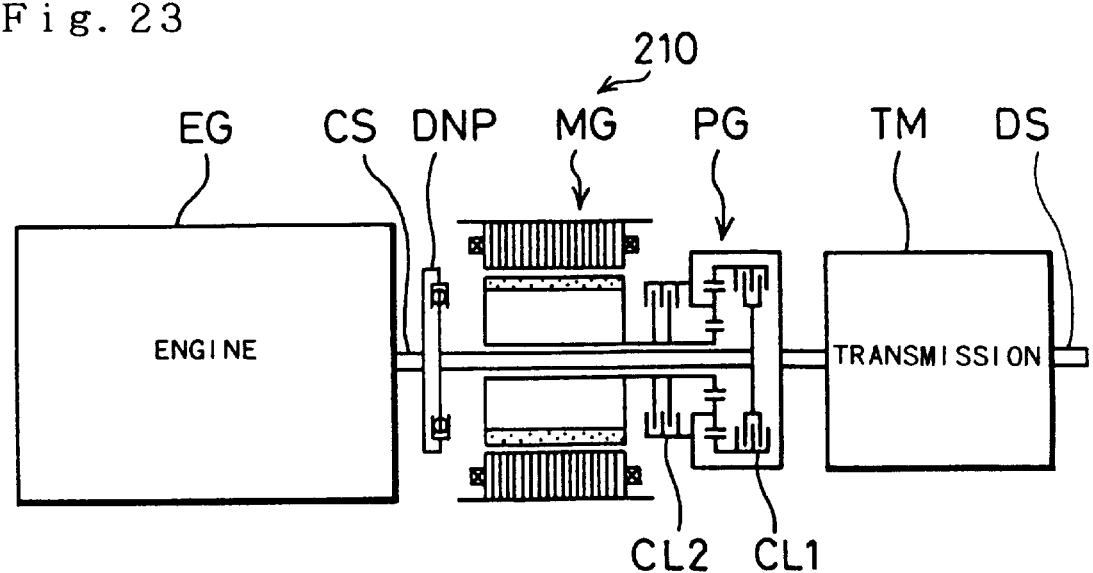
FIG. 23 schematically illustrates structure of another power output apparatus 210 as an modified example.
Figure 24:
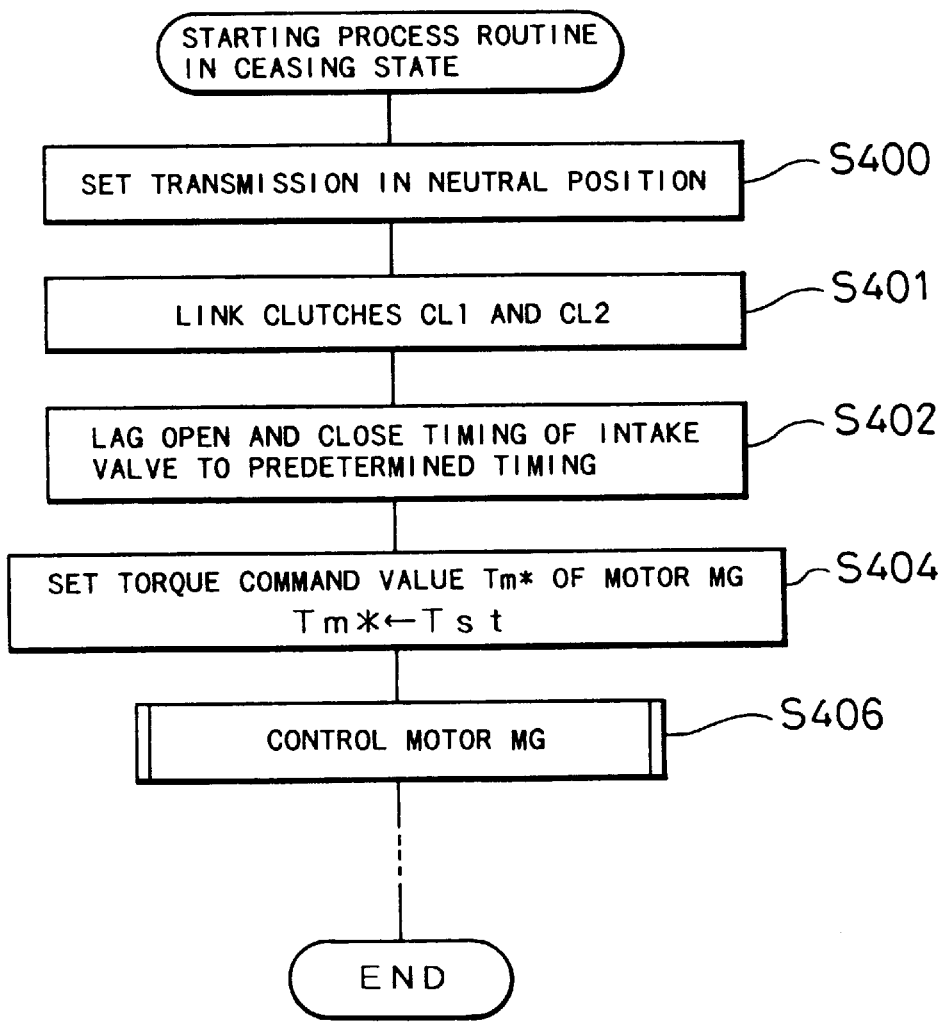
FIG. 24 is a flowchart showing part of a starting process routine in a ceasing state executed by the power output apparatus 210 of the modified structure.

In the above embodiments, the crankshaft 156 of the engine 150 is connected to the planetary gear 120 and the motors MG1 and MG2 via the damper 157 and the carrier shaft 127, and the first motor MG1 functions to motor the crankshaft 156 of the engine 150. Another power output apparatus 210 having a different structure is illustrated in FIG. 23 as a modified example. In the power output apparatus 210 of the modified structure, a crankshaft CS of an engine EG is connected to a motor MG via a damper DNP and a planetary gear PG by setting a transmission TM in the neutral position and connecting clutches CL1 and CL2 attached to the planetary gear PG with each other, thereby enabling the motor MG to motor the engine EG. The power output apparatus 210 of this modified structure can carry out the processing routines of the first embodiment, that is, the starting process routine in the ceasing state shown in FIG. 7, the starting process routine in the motor driving state shown in FIG. 11, and the engine stop processing routine shown in FIG. 15, as well as the processing routines of the second embodiment, that is, the starting process routine in the ceasing state shown in FIG. 16, the starting process routine in the motor driving state shown in FIG. 18, and the engine stop processing routine shown in FIG. 20. A little modification is, however, required for application of these routines since the power output apparatus 210 has a different hardware structure. By way of example, the processing of steps S100 through S106 in the starting process routine in the ceasing state of FIG. 7 is replaced by the processing of steps S400 through S406 shown in the flowchart of FIG. 24. In this modified structure, the control CPU 190 of the controller 180 sets the transmission TM in the neutral position at step S400, links the clutches CL1 and CL2 with each other at step S401, lags the open and close timing of the intake valve to a predetermined timing at step S402, and sets a predetermined torque TST for motoring to a torque command value Tm* of the motor MG at step S404 before controlling the motor MG at step S406.

The power output apparatus 210 of this modified structure may include the resonance decision circuit 200 shown in FIG. 21 and carry out the resonance decision routine shown in the flowchart of FIG. 22.

Figure 25:
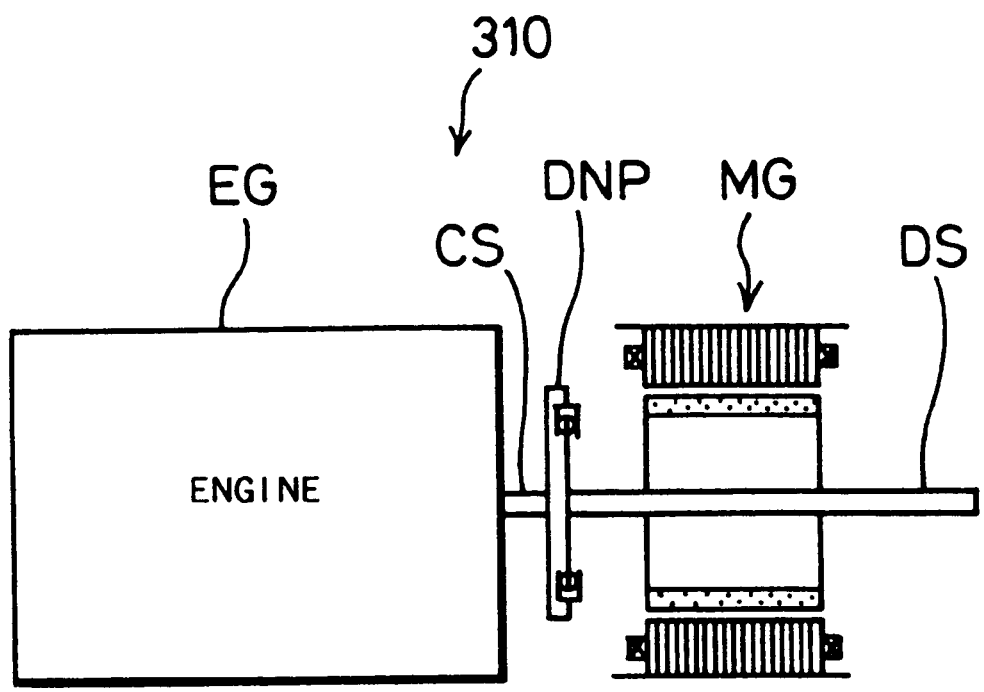
FIG. 25 schematically illustrates structure of still another power output apparatus 310 as another modified example.

The principle of the present invention is applicable to any structure, in which the crankshaft of the engine is mechanically connected to the motor via the damper. As shown in still another power output apparatus 310 illustrated in FIG. 25 as another modified example, the crankshaft CS of the engine EG may be directly connected to the motor MG via the damper DNP.

The present invention is not restricted to the above embodiments or applications, but there may be many modifications, changes, and alterations without departing from the scope or spirit of the main characteristics of the present invention. For example, although the power output apparatus is mounted on the vehicle in all the above embodiments, it may be mounted on other transportation means like ships and airplanes as well as a variety of industrial machines.

It should be clearly understood that the above embodiments are only illustrative and not restrictive in any sense. The scope and spirit of the present invention are limited only by the terms of the appended claims.

What is claimed is:

1. A driving system comprising:
   an internal combustion engine connecting with an output shaft via a damper;
   a motor having a rotating shaft mechanically connected to said output shaft;
   compression ratio varying means for varying an effective compression ratio of said internal combustion engine;
   driving state detecting means for detecting a driving state of said internal combustion engine;

motor control means for driving and controlling said motor in response to a predetermined driving requirement, in order to motor said internal combustion engine while a fuel supply to said internal combustion engine is stopped; and compression ratio regulation means for, when the driving state of said internal combustion engine detected by said driving state detecting means in the process of motoring by said motor control means is within a predetermined range, regulating said compression ratio varying means to make the effective compression ratio of said internal combustion engine lower in the driving state within said predetermined range than that in the driving state out of said predetermined range.

2. A driving system in accordance with claim 1, wherein said predetermined range includes a specific range, in which a system comprising said internal combustion engine, said damper, and said motor causes a torsional resonance.

3. A driving system in accordance with claim 2, wherein said compression ratio varying means comprises means for regulating an open and close timing of an intake valve of said internal combustion engine.

4. A driving system in accordance with claim 3, said driving system further comprising:

operation starting means for, when the driving state of said internal combustion engine detected by said driving state detecting means reaches a predetermined driving condition after a starting requirement of said internal combustion engine, initiating a fuel supply to said internal combustion engine and ignition, so as to start operation of said internal combustion engine, wherein said predetermined driving requirement is said starting requirement of said internal combustion engine, said predetermined range is included in a certain range from a start of motoring said internal combustion engine to a point at which the driving state of said internal combustion engine reaches said predetermined driving condition.

5. A driving system in accordance with claim 3, said driving system further comprising:

fuel supply stopping means for stopping a fuel supply to said internal combustion engine, in response to an operation stop requirement of said internal combustion engine, wherein said predetermined driving requirement is said operation stop requirement of said internal combustion engine, said predetermined range is a range from a point at which the driving state of said internal combustion engine detected by said driving state detecting means reaches said predetermined driving condition to a stop of said internal combustion engine.

6. A driving system in accordance with claim 4, said driving system further comprising:

three shaft-type power input/output means having three shafts respectively and mechanically linked with said output shaft, said rotating shaft of said motor, and a drive shaft, when powers are input to and output from any two shafts among said three shafts, said power input/output means inputting and outputting power, which is determined according to the input and output powers, to and from a residual one shaft; and a second motor for inputting and outputting power to and from either one of said output shaft of said internal combustion engine and said drive shaft.

7. A driving system comprising:

an internal combustion engine connecting with an output shaft via a damper;

a motor having a rotating shaft mechanically connected to said output shaft;

driving state detecting means for detecting a driving state of said internal combustion engine; and motor control means for driving and controlling said motor in response to a predetermined driving requirement, in order to motor said internal combustion engine while a fuel supply to said internal combustion engine is stopped, wherein said motor control means comprises means for, when the driving state detected by said driving state detecting means is within a predetermined range, driving and controlling said motor, so as to enable said output shaft of said internal combustion engine to rotate at a greater rotational angular acceleration in the driving state within said predetermined range than that in the driving state out of said predetermined range.

8. A driving system in accordance with claim 7, wherein said predetermined range includes a specific range, in which a system comprising said internal combustion engine, said damper, and said motor causes a torsional resonance.

9. A driving system in accordance with claim 8, said driving system further comprising:

operation starting means for, when the driving state of said internal combustion engine detected by said driving state detecting means reaches a predetermined driving condition after a starting requirement of said internal combustion engine, initiating a fuel supply to said internal combustion engine and ignition, so as to start operation of said internal combustion engine, wherein said predetermined driving requirement is said starting requirement of said internal combustion engine, said predetermined range is included in a certain range from a start of motoring said internal combustion engine to a point at which the driving state of said internal combustion engine reaches said predetermined driving condition.

10. A driving system in accordance with claim 8, said driving system further comprising:

fuel supply stopping means for stopping a fuel supply to said internal combustion engine prior to motoring said internal combustion engine by said motor control means, in response to an operation stop requirement of said internal combustion engine, wherein said predetermined driving requirement is said operation stop requirement of said internal combustion engine, said predetermined range is a range from a point at which the driving state of said internal combustion engine detected by said driving state detecting means reaches said predetermined driving condition to a stop of said internal combustion engine.

11. A driving system in accordance with claim 9, said driving system further comprising:

three shaft-type power input/output means having three shafts respectively and mechanically linked with said output shaft, said rotating shaft of said motor, and a drive shaft, when powers are input to and output from any two shafts among said three shafts, said power input/output means inputting and outputting power, which is determined according to the input and output powers, to and from a residual one shaft; and a second motor for inputting and outputting power to and from either one of said output shaft of said internal combustion engine and said drive shaft.

12. A driving system comprising:

an internal combustion engine connecting with an output shaft via a damper;

a motor having a rotating shaft mechanically connected to said output shaft;

motor control means for driving and controlling said motor in response to a predetermined driving requirement, in order to motor said internal combustion engine while a fuel supply to said internal combustion engine is stopped;

resonance energy measuring means for measuring resonance energy of a torsion of a system comprising said internal combustion engine, said damper, and said motor; and motoring stop means for, when the resonance energy measured by said resonance energy measuring means is not less than a predetermined value, driving and controlling said motor to stop motoring said internal combustion engine, irrespective of the control of said motor by said motor control means.

13. A driving system in accordance with claim 12, wherein said predetermined driving requirement is said starting requirement of said internal combustion engine.

14. A driving system in accordance with claim 13, said driving system further comprising:

three shaft-type power input/output means having three shafts respectively and mechanically linked with said output shaft, said rotating shaft of said motor, and a drive shaft, when powers are input to and output from any two shafts among said three shafts, said power input/output means inputting and outputting power, which is determined according to the input and output powers, to and from a residual one shaft; and a second motor for inputting and outputting power to and from either one of said output shaft of said internal combustion engine and said drive shaft.

15. A driving system comprising:

an internal combustion engine connecting with an output shaft via a damper;

a motor having a rotating shaft mechanically connected to said output shaft;

motor control means for driving and controlling said motor in response to a predetermined driving requirement, in order to motor said internal combustion engine while a fuel supply to said internal combustion engine is stopped;

driving state detecting means for detecting a driving state of said internal combustion engine;

time counting means for counting a time period for which the driving state detected by said driving state detecting means is continuously kept in a predetermined range; and motoring stop means for, when the time period counted by said time counting means is not shorter than a predetermined time period, driving and controlling said motor to stop motoring said internal combustion engine, irrespective of the control of said motor by said motor control means.

16. A driving system in accordance with claim 15, wherein said predetermined driving requirement is said starting requirement of said internal combustion engine.

17. A driving system in accordance with claim 16, wherein said predetermined range includes a specific range, in which a system comprising said internal combustion engine, said damper, and said motor causes a torsional resonance.

18. A driving system in accordance with claim 17, said driving system further comprising:

three shaft-type power input/output means having three shafts respectively and mechanically linked with said output shaft, said rotating shaft of said motor, and a drive shaft, when powers are input to and output from any two shafts among said three shafts, said power input/output means inputting and outputting power, which is determined according to the input and output powers, to and from a residual one shaft; and a second motor for inputting and outputting power to and from either one of said output shaft of said internal combustion engine and said drive shaft.

* * * * *